(12) United States Patent
Moore

(10) Patent No.: US 10,151,411 B2
(45) Date of Patent: Dec. 11, 2018

(54) INTERFERENCE SECURING MECHANISM

(75) Inventor: Simon Garry Moore, Cambridge (NZ)

(73) Assignee: PUKU LIMITED, Cambridge (NZ)

( * ) Notice: Subject to any disclaimer, the term of this patent is extended or adjusted under 35 U.S.C. 154(b) by 1339 days.

(21) Appl. No.: 13/510,239

(22) PCT Filed: Nov. 17, 2010

(86) PCT No.: PCT/NZ2010/000230
§ 371 (c)(1),
(2), (4) Date: May 16, 2012

(87) PCT Pub. No.: WO2011/062511
PCT Pub. Date: May 26, 2011

(65) Prior Publication Data
US 2012/0274064 A1 Nov. 1, 2012

(30) Foreign Application Priority Data
Nov. 20, 2009 (NZ) .......................................... 581377

(51) Int. Cl.
*F16L 33/00* (2006.01)
*F16L 33/22* (2006.01)

(52) U.S. Cl.
CPC .................................. *F16L 33/227* (2013.01)

(58) Field of Classification Search
CPC ....... F16L 33/227; F16L 33/22; F16L 33/228; F16L 33/00; F16L 33/03; F16L 37/05; F16B 21/08
USPC ...... 267/1.5, 69, 70; 403/350; 285/244, 115, 285/114
See application file for complete search history.

(56) References Cited

U.S. PATENT DOCUMENTS

| | | | |
|---|---|---|---|
| 2,807,502 A * | 9/1957 | Tharp | ............................ 239/515 |
| 3,907,342 A | 9/1975 | Dudek | |
| 4,021,061 A | 5/1977 | Zimmerman | |
| 4,335,753 A | 6/1982 | Frye | |
| 4,509,763 A * | 4/1985 | Fischer | ............... E21B 33/1208 267/1.5 |
| 4,635,966 A | 1/1987 | Hermann | |

(Continued)

FOREIGN PATENT DOCUMENTS

| | | | | |
|---|---|---|---|---|
| FR | 931498 A * | 2/1948 | ............... | F16L 33/22 |
| GB | 191303043 A * | 0/1913 | .............. | F16L 33/24 |
| GB | 2251044 | 6/1992 | | |

*Primary Examiner* — David E Bochna
*Assistant Examiner* — James A Linford
(74) *Attorney, Agent, or Firm* — Fay Sharpe LLP

(57) ABSTRACT

A connector is provided for holding a deformable tube, and includes a connection head, an inner portion extending from the head, an outer portion extending from the head and at least partially surrounding the inner portion to define a tube entry passage, the entry passage has a constricting area of lesser width than the width of the tube wall, and the outer and inner portions move relative to each other to allow entry of the tube past the constricting area and further into the passage, after insertion of the tube past the constricting area, and on application of a translational force to the tube, the outer and inner portions are configured to bear further against the elastically deformable tube such that the tube is held between the inner and the outer portions. At least one of the outer portion and the inner portion is at least partially helical in construction.

19 Claims, 28 Drawing Sheets

(56) References Cited

U.S. PATENT DOCUMENTS 4,640,535 A 2/1987 Hermann
4,750,764 A 6/1988 Gibellina

* cited by examiner

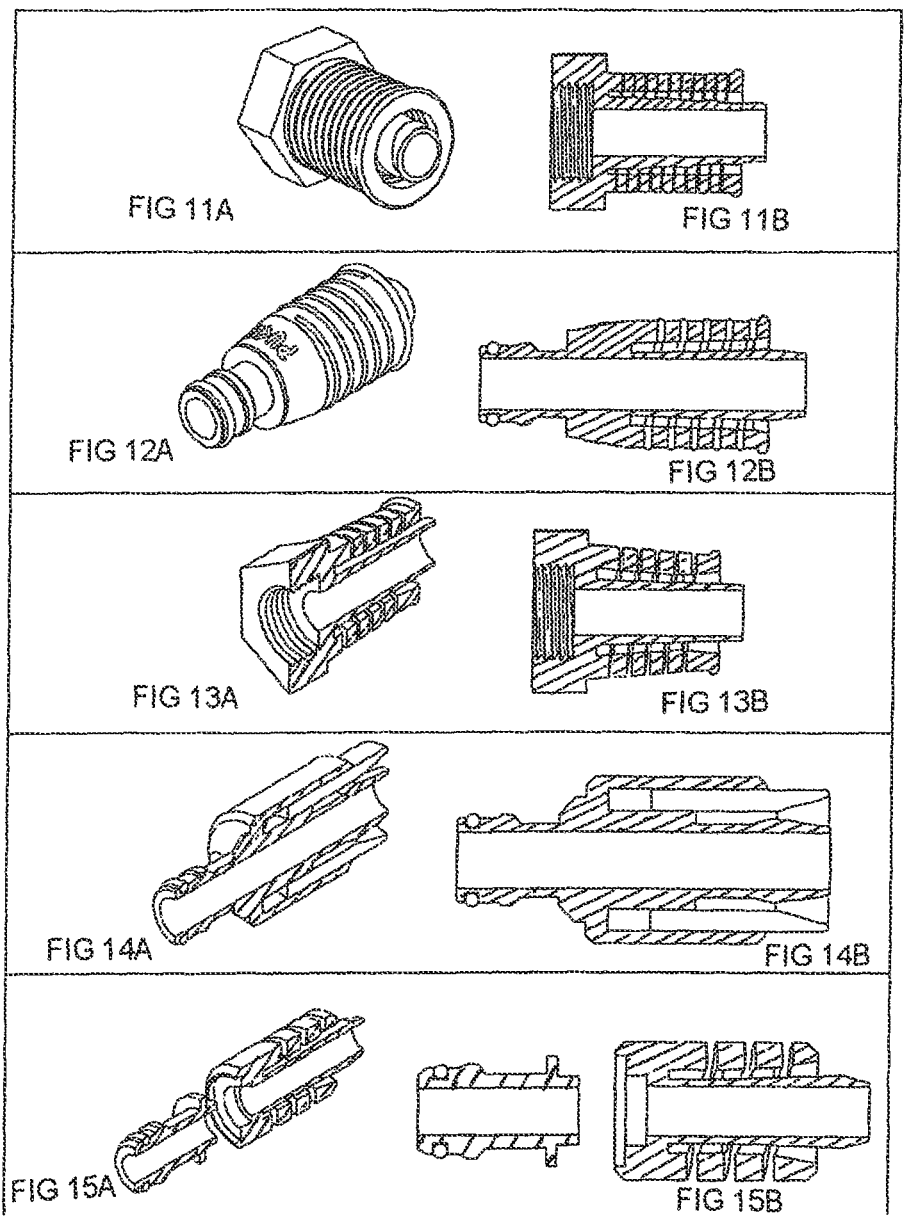

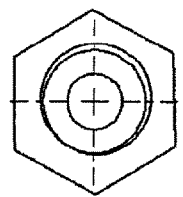
FIG. 18A
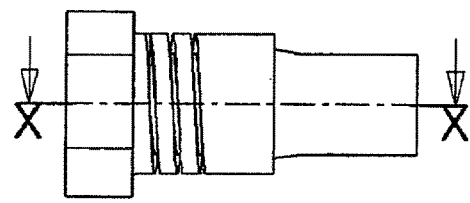
FIG. 18B
FIG. 18C
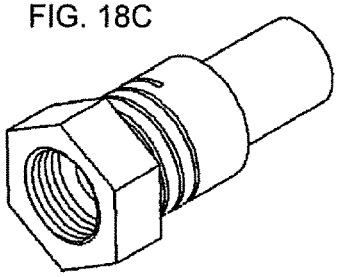
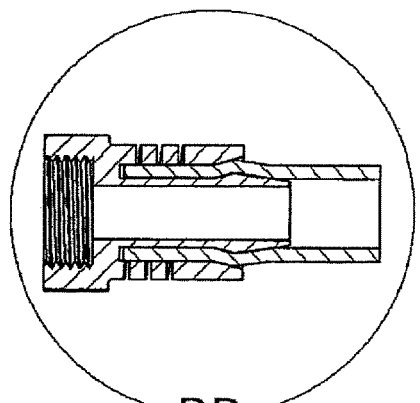
FIG. 18D
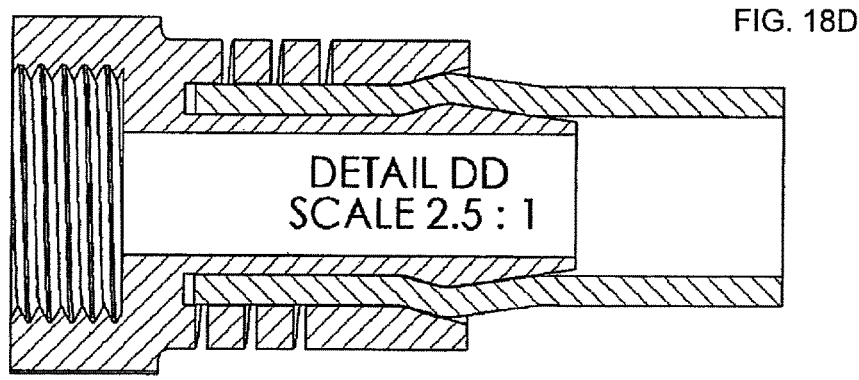
DETAIL DD
SCALE 2.5 : 1

164

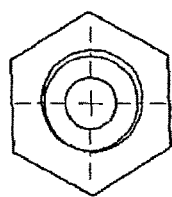
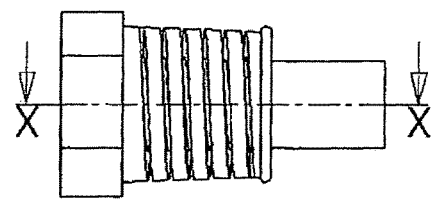
FIG. 20A          FIG. 20B
FIG. 20C
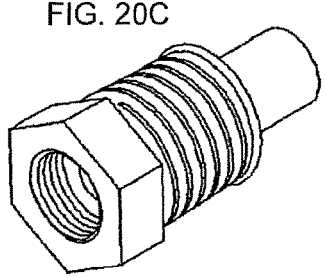
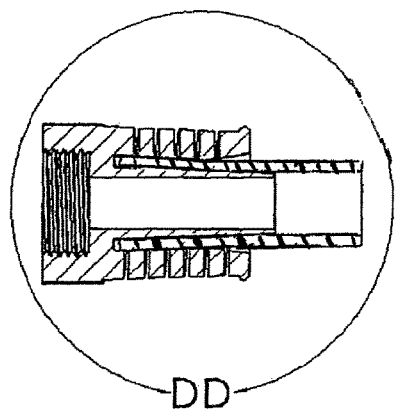
FIG. 20D
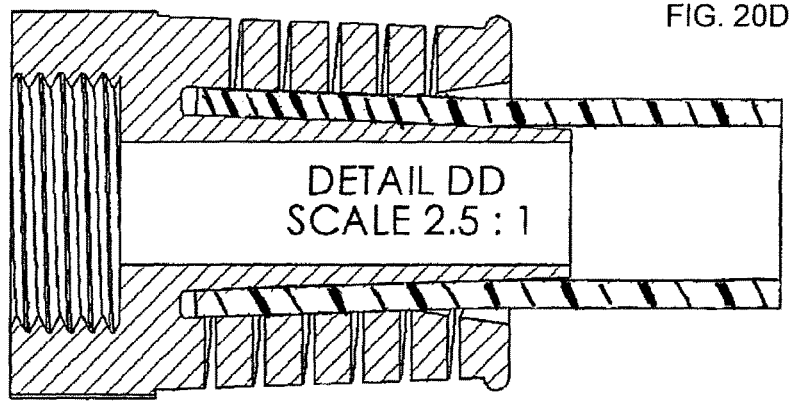
DETAIL DD
SCALE 2.5 : 1

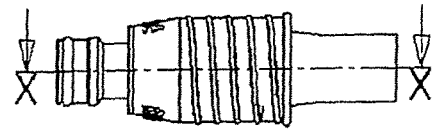
FIG. 22A  FIG. 22B
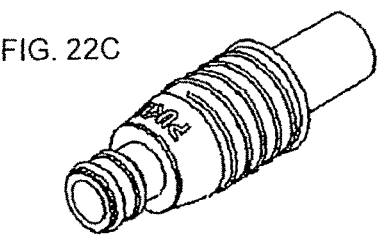
FIG. 22C
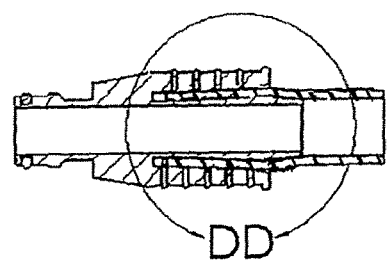
FIG. 22D
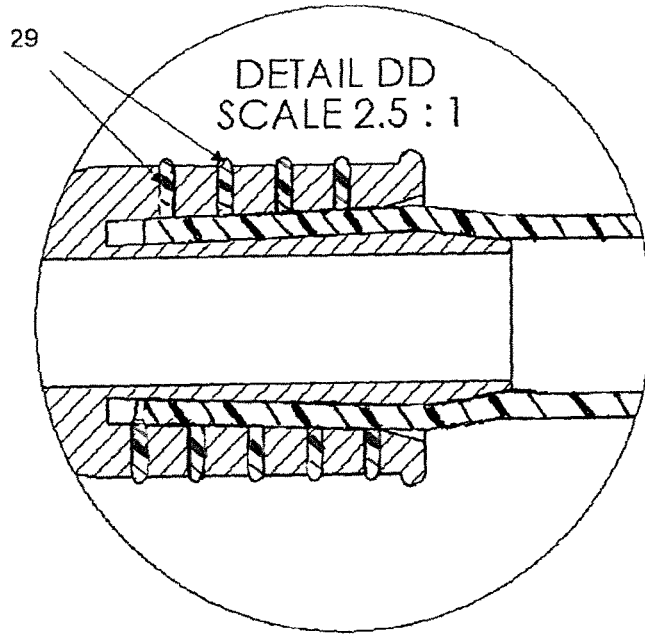
DETAIL DD
SCALE 2.5 : 1

67  69  68  70

92

FIG 29
FIG 30
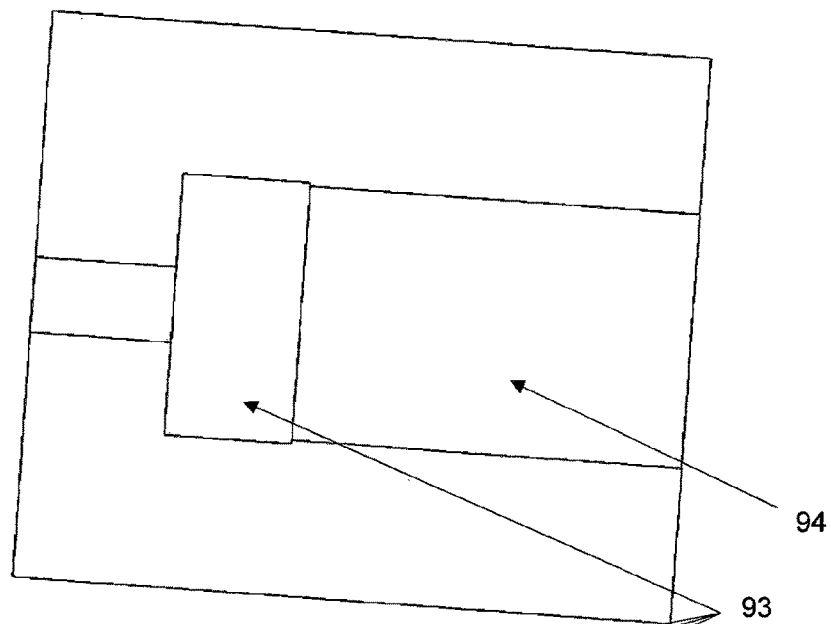
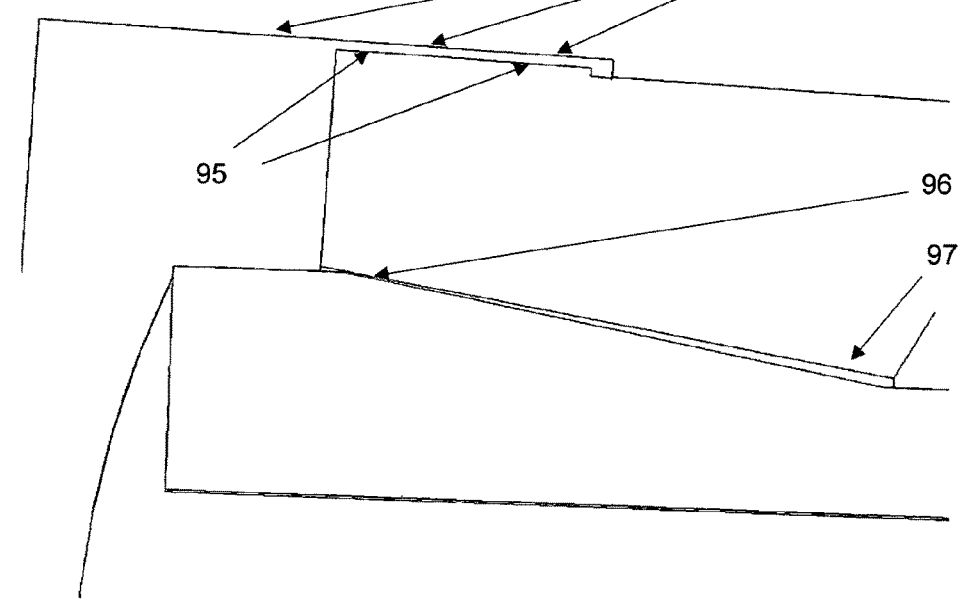

FIG 32
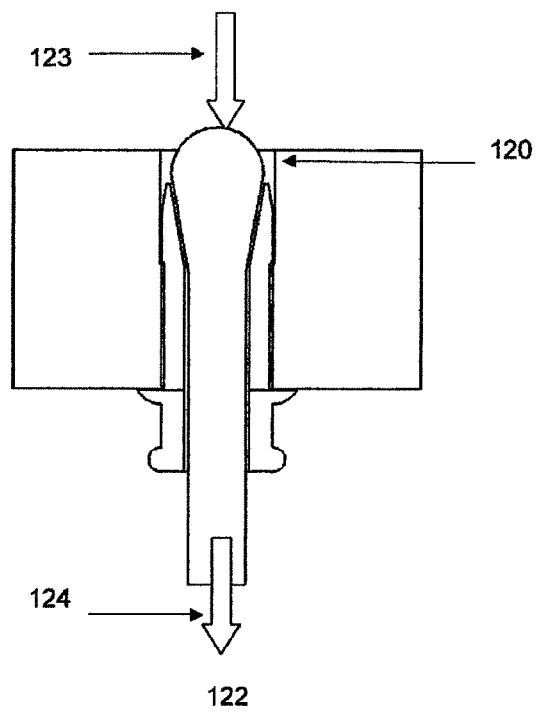
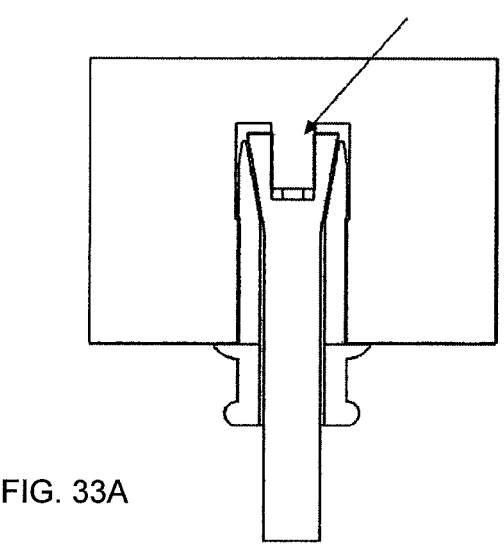
FIG. 33A
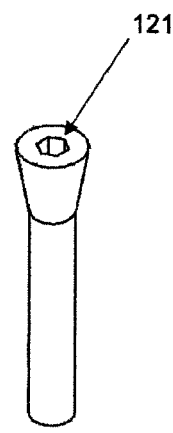
FIG. 33B

150

151

160

183 182 181

180

180 181

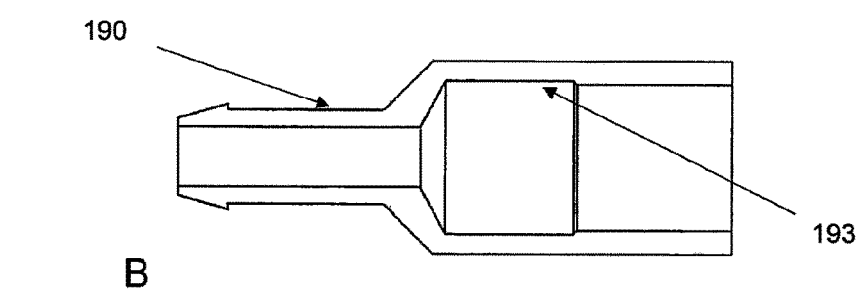
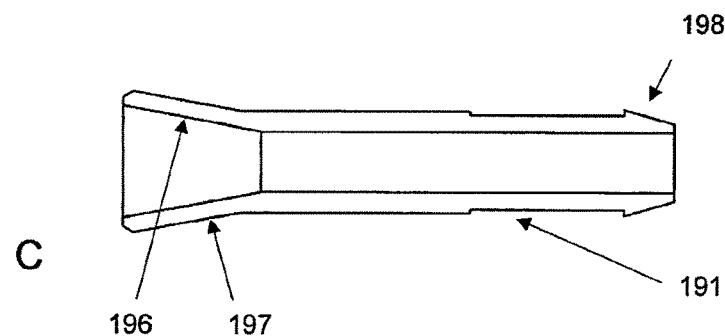
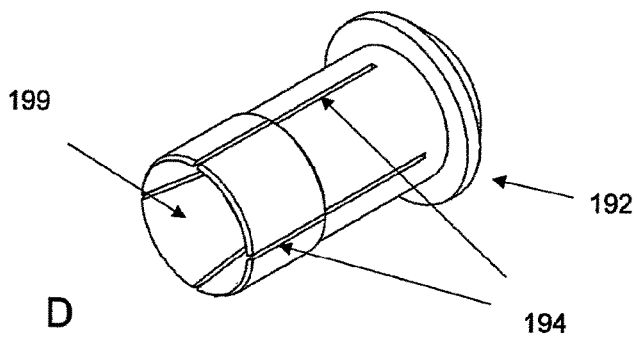

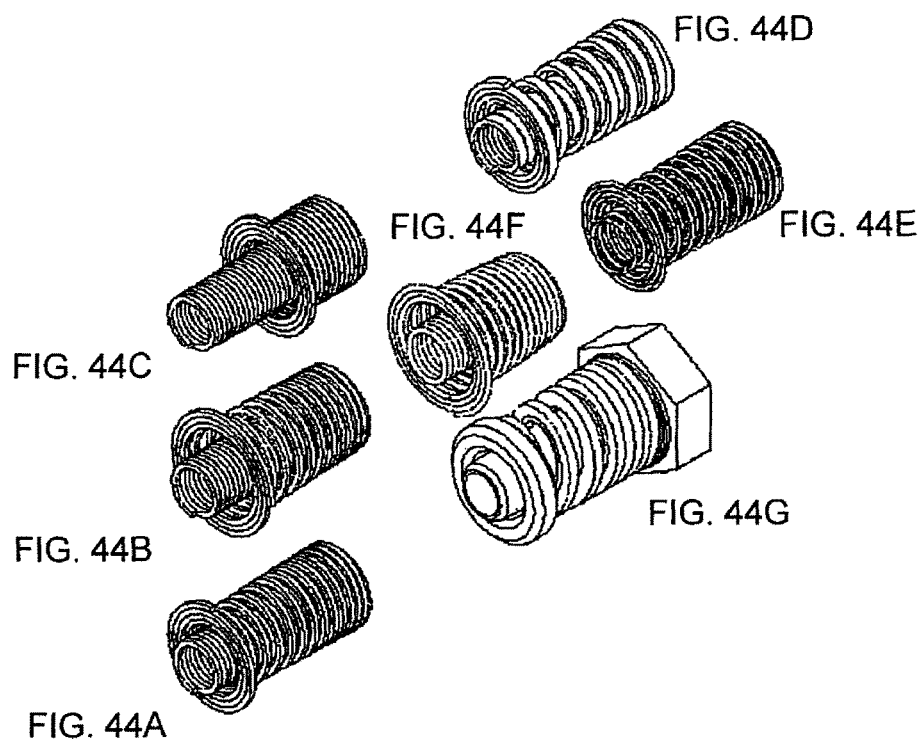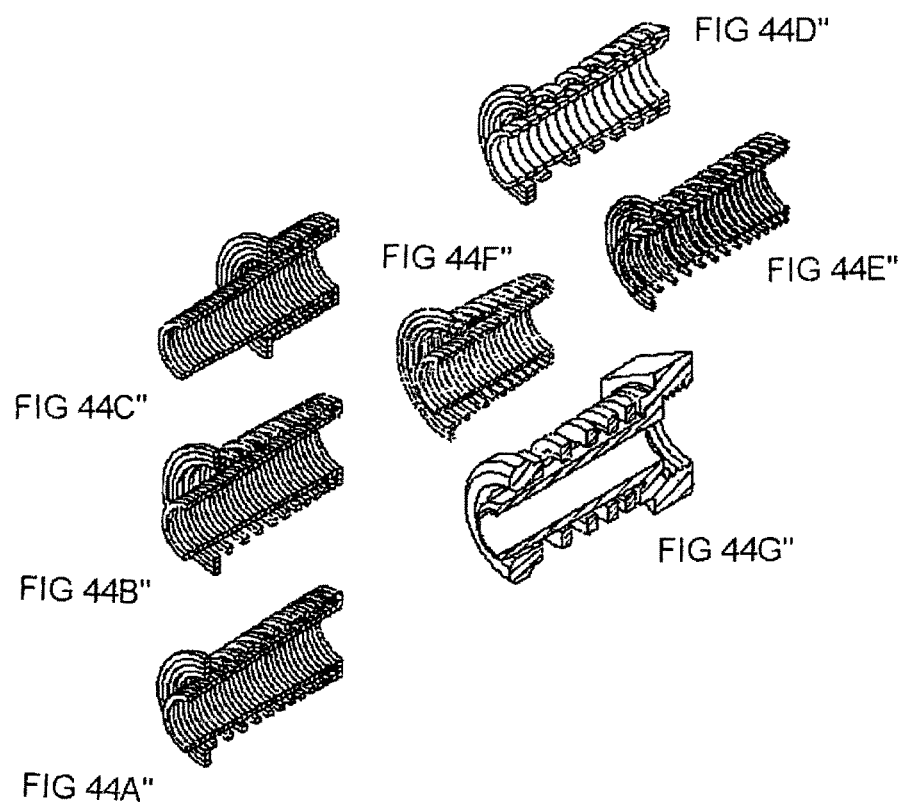

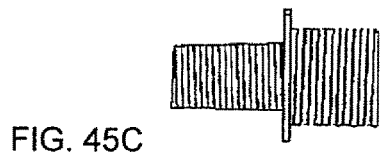
FIG. 45C
FIG. 45D
FIG. 45B
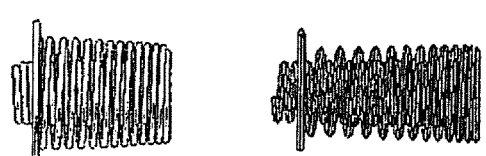
FIG. 45F          FIG. 45E
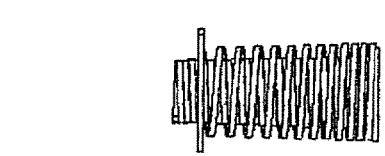
FIG. 45A
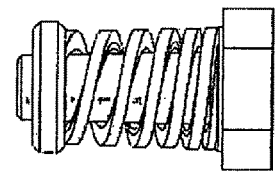
FIG. 45G
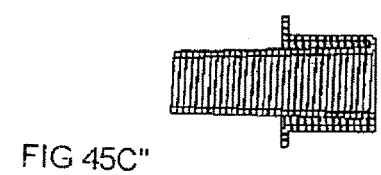
FIG 45C"
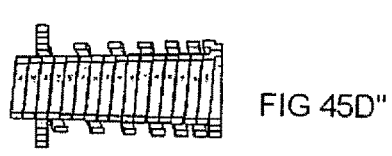
FIG 45D"
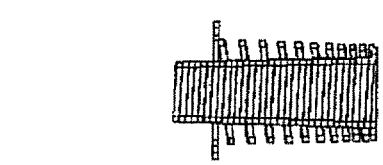
FIG 45B"
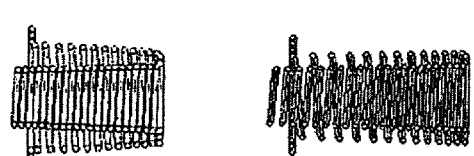
FIG 45F"          FIG 45E"
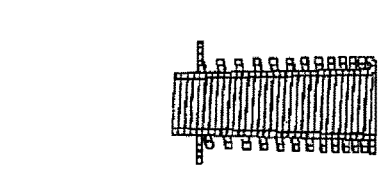
FIG 45A"
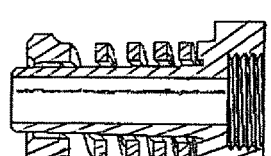
FIG 45G"

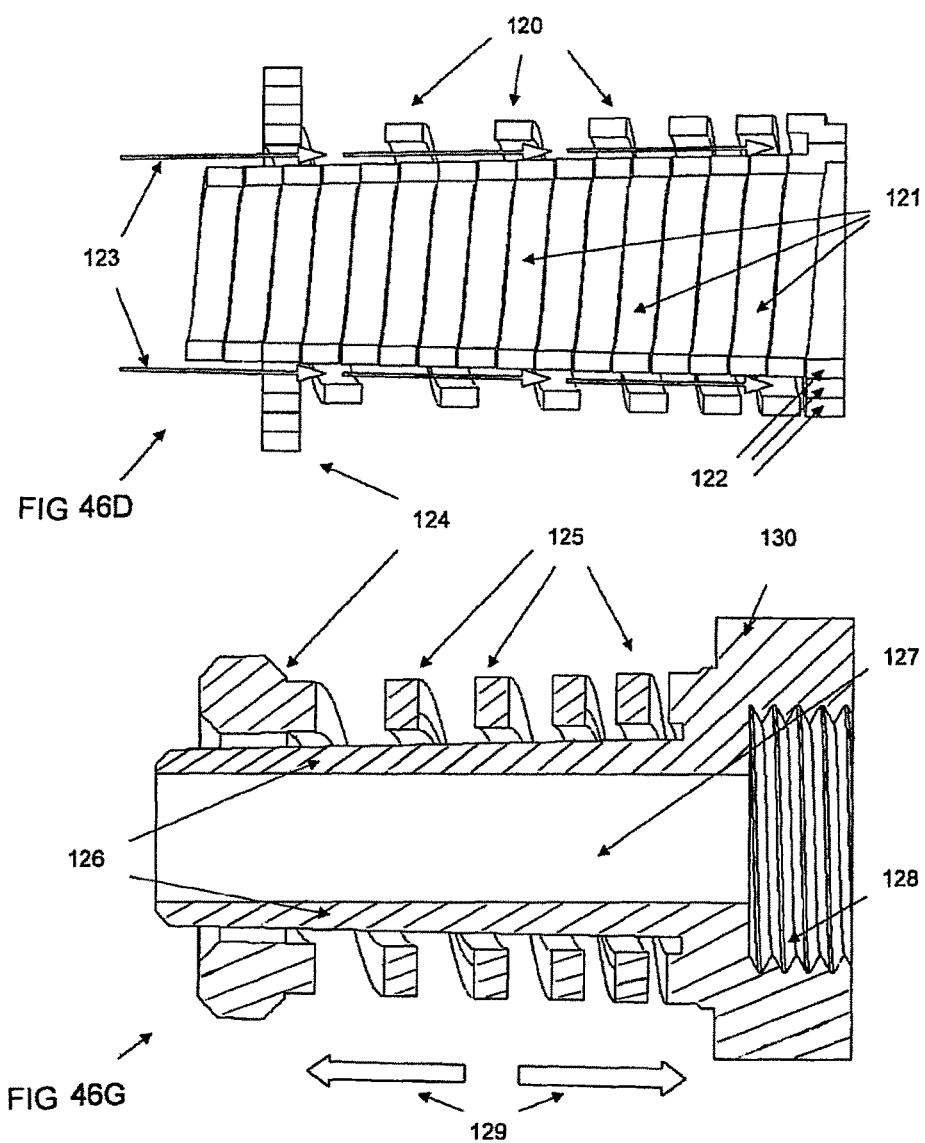

INTERFERENCE SECURING MECHANISM

TECHNICAL FIELD

The present invention relates to novel interference securing mechanisms.

BACKGROUND ART

An unresolved connection problem is in the area of the common click-fit garden hose fitting. The prior art generally has a thread able hose to fitting connection and the connectors fit together via a click-fit male to female arrangement sealed with an O-ring. However it is well known that these items work quite well when new but soon become problematic:
1. The click-fit becomes difficult to use, perhaps due to retained foreign bodies such as dirt and sand found in a garden environment.
2. The threadable hose to fitting connection becomes difficult to use,
3. Small part details, e.g. plastic lugs and barbs, bend or break making the items problematic to assemble,
4. When the hose is pulled the hose to fitting connection fails,
5. The connection leaks.

Generally the connection and or relative orientation of two or more objects often can be a critical aspect of the way the objects perform their function.

Expansionary or taper locks are used in prior art hardware and fasteners where a pull force, linear or rotary, on an inner shaft element, causes a dimensional change to another outer part, and the locking action is achieved primarily by an interference fit. For example:
1. Utilizing pull forces:
   a. In conventional aluminium rivets the central shaft element, generally steel, part is pulled, causing plastic expansion of the aluminium outer part, and thereby secures, for example, sheet metal together.
   b. In a Rawl™ bolt, or a masonry anchor bolt, a pull force arrived at by threaded engagement, causes an outer element to expand and lock in a cavity.
   c. In a cavity wall fitting the rotation of a central threaded element causes a pull force on an element in the wall cavity, leading to an increase in diameter, and the expansion element to secure against the inner (cavity side) surface of the lining or plaster board.
2. Utilizing push forces:
   a. In a wall plug situation, (used for example for securing into a blind hole previously drilled in a brick wall), a push force causes the threaded element to engage into the wall plug and expands it in the blind hole. The push force can only be operated from the one side and the assembly process has the two parts moving closer together as the securing action occurs.
   b. When a nail is hammered into a piece of wood there is to be seen a push force which makes its own aperture and interference fit. Prior to the use of the nail there is no aperture and the fastener makes an aperture.
   c. A variant of a push force is in the common garden fitting which applies its push force via rotary action of a nut with an internal thread that engages to the main body.

In all the above cases a pull or turn force is applied to a central 'shaft' element. The fixing force pulls the elements together, or pushes the elements together. Unfortunately the connections are overly reliant upon the use of a tool, or the skill, strength, and intent of the person using the parts. It would be much better if connections had some or all of the following general characteristics:
1. The parts can be put together without tools, and
2. The parts can be put together only one way, and
3. The locking force is somewhat automatic and not reliant upon the skill, strength, and intent of the person using the parts, and
4. The locking force were defined by the parts—not the person, and
5. The lock was binary in character—off or on—and the intermediary "partially secure" steps were either impossible to arrive at, obvious, or very unlikely to be arrived at. This outcome is more likely by obvious tactile, vibratory, auditory of visual cues.

The problems with present connections can be illustrated with reference to garden hose fittings, and "quick connect" plumbing fittings.
1. With a garden hose connection a common scenario is the difficulty in operating a threaded hose pipe connection which is generally a compression fitting where a threaded collar compresses a sleeve element onto a plain hose pipe. These fittings are common, but of course used in an environment where there is often soil or other debris to foul the thread. These thread based garden hose fittings also often have problems with adequate sealing, requiring significant tightening. It would be better it the items were easier to operate, more durable and avoided threaded connection altogether. Better yet would be a hose connection which is somewhat binary so the item is clearly locked and sealed or not so. In this way the user would be confident of the connection.
2. In recently developed "quick-connect" plumbing fittings, such as by Watts™ the general principle is that the plain copper or Pex™ hose/pipe is inserted and expands a sleeve element and then a sealing element—an o-ring. However if the insertion is only partial the pipe will be secured but the o-ring not engaged leading to failure initially or over time. It would be much better if the sealing and connection occurred at the same location and that there was a binary—"OFF or ON"—aspect to the connection. It would also be beneficial if there was a clear audible click, seating vibration, or similar to confirm the successful connection has occurred.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein; this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

DISCLOSURE OF THE INVENTION

According to one aspect of the present invention there is provided a connector for holding an elastically deformable tube, the connector including
a connection head
an inner portion extending from the connection head,
an outer portion extending from the connection head and at least partially surrounding the inner portion to define an entry passage for the elastically deformable tube
wherein the entry passage has at least one constricting area of a lesser width than the width of the tube wall, and
the outer portion and inner portions are configured to move relative to each other to allow entry of the tube past the constricting area and further into the entry passage,
characterised in that
after insertion of the tube past the constricting area towards the connection head and on application of a translational force to the tube in a direction away from the connection head,
the outer portion and inner portions are between them configured to bear further against the elastically deformable tube such that the tube is held between the inner portion and the outer portion.

It should be appreciated that it is envisaged that the material from which this invention may be made is preferably of a type, and construction, that is rigid and/or possesses an elastic ability—a "material memory". Specifically a garden hose is somewhat elastic and this character is used to advantage in this invention to create a secure dovetail lock.

Definitions

For the purposes of this patent disclosure the following definitions apply, and are integral parts of this invention disclosure:
1. The term "helical" means either "spiral or helical" in the normal literal sense, but also can be taken to mean "capable of radial expansion and contraction, with or without associated lineal contraction and expansion". A helix is generally a shape capable of simple mathematical description via specifying its length, diameter, and pitch.
   a. The cross section is generally, but need not be, constant. The exterior diameter may be constant, but need not be. The interior bore diameter may be constant, but need not be. The pitch is generally, but need not be, constant. For example a helical form may start with a pitch of 2 mm at a first end, attain a pitch of 10 mm in a central area, and finish with a pitch of 3 mm at a second end.
   b. An example of more unusual helices under this definition are hollow woven braided tubes, and elastic material tubes.
   c. Whilst the cross sections of the drawings herein are generally square, and otherwise round, this is not limiting in any way, and any cross section may be used for iterations to advantage, including rectangular, oval, irregular, and modified round (perhaps ground).
      i. The cross section could be defined to be custom to a particular fitting requirement. For example after a CT scan—or similar—of the jaw or bone, the artificial part could be custom designed so it can helically engage to, or otherwise fit to, the organic form of the jaw or bone. This could lead to the form of the helical insert being quite different in situ than originally made.
2. Helical can mean any of the following:
   a. A tube with an elastic wall,
   b. A corrugated (perhaps helical) wall tube,
   c. A tube with one or more helical slots, or a tube form with one or more helical slots,
   d. A tube with one or more generally linear slots,
   e. A single simple corkscrew like detail,
   f. A helix which is in the nature of a standard extension spring—with the winds actually touching each other—or alternatively the helix may semi extended, which is shown in the drawings where a slight gap can be seen between the winding helix forms,
   g. Several corkscrew details, which has the clear advantage of better resisting a single corkscrew detail being inadvertently twisted off a wire with sideways force application.
   h. An extension or compression spring,
   i. A multi start helical design,
   j. A complex start helical design which is a single start helix in a first area and a multi start helix in at least a second area.
   k. More than one helical detail adjacent to each other (including where there is one helical form overlying another non helical or axial detail),
   l. A woven bidirectional helical design in the general character of a braided tow rope, or a Chinese finger trap/pull toy.
   m. A bidirectional helical design in the general character of overlapping helical details which are clockwise and anti clockwise.
   n. A spiral form where there is considerable overlap of overlying layers of material.
   o. A helical form where the helical angle is shallow or "slow" as in normal springs, say 1-10 degrees, or with any other steep or "fast" wind, for example 80 degrees. The later can be visualised via a simple form with a number of generally co-axial, rods with a central common axis, which gently wind about the axis.
      i. A helical form with a variable pitch where it is slow in area and fast in other areas.
3. The terms "connection" "mechanism" and "fastener" shall be interchangeable and include a temporary, permanent, adjustable, and fixed connection, and shall include any part or subpart which serves to fasten the larger whole part, and therefore shall include any device, assembly, or unitary item.
4. The term "spring", shall be taken in the broadest sense including the use of simple one start helix such as:
   a. a simple spring,
   b. compressed springs,
   c. extended springs,
   d. helical mechanisms,
   e. complex multi-spring assemblies, f. two start springs with 2 or more adjacent winds made from a single piece of metal/plastic/polymer which winds back and forth,
g. multi-start helices,
h. overlapping helical elements,
i. threadably co-operating helical elements (where one part is threadably inserted or wound at least partially into another),
j. complex multi material springs consisting of a rigid material interspaced by an elastic type material,
k. braided or interwoven parts (including soft or spring forms of a braided rope or Chinese finger trap),
l. Other parts which because of their design, and/or materials (perhaps elastic), can act as springs in use.
Note:
Any adjacent part or material may be considered as either a separate part or as an integral part of a spring.

5. A "self locking device" is a part which substantially defines a locking force by itself, so the action of a person is to assemble the parts, but the primary locking force can be considered to be less dependant on the persons skill, intent, or strength, but more determined by the mechanical and design character of at least one part.

6. An "interference fit" is a frictional engagement between touching adjacent parts, where adjacent surfaces may have features which are smooth/textured, rigid/elastic, parallel/tapered, circular/non circular cross-section, regular/irregular cross-section, ribbed/plain/splined, with matching/non-matching taper angles, or any other arrangement/combination.

7. The terms "wires, rods, tubes, hoses, cables, or other elements which have at least one generally linear aspect" shall be interchangeable.

8. Generically, a thread in the present invention is a spiral ridge extending along a surface, wherein the threads themselves are helical in form. In preferred embodiments the threads are of a fairly conventional form with a sharp or tapered edge, which can readily cooperate with complimentary threads in the same means as a conventional bolt and nut. It is this interaction that gives requisite strength, grip, fine tolerances and required interaction between the two objects.

9. "Material memory" means that if the part is deformed through forces placed on it, there is a natural tendency for the somewhat elastic character of the material to bias the part back towards its original shape. For example a common garden hose and a paperclip exhibit this characteristic.
a. A super elastic material is defined as one which may deform in a manner where a dimension can increase by a factor of at least 1.5 times, but then subsequently is capable of elastically returning to the original dimension.

10. A beneficial embodiment on this invention incorporates an anti pull out dovetail feature which may be in a number of forms:
a. A "virtual dovetail"—is a mechanism which, when secure, creates a virtual dovetail to resist pull out. The term virtual refers to the fact the surface may be not reverse taper or dovetail in nature, or just marginally so, prior to assembly to the hose. The surface that forms the taper or anti pull out detail is functionally enhanced in the locked state—increased in inclination to the primary axis—when compared to the preassembled state.
b. An "spring dovetail"—is a mechanism where a spring element is deformed helically or linearly, and subsequently by a reactionary force, causes enhanced locking on a surface—perhaps a dovetail or reverse taper surface.
c. A "translation dovetail"—is a mechanism where a translation-capable element can move in a generally axial direction to cause causes enhanced locking on a surface—perhaps a dovetail or reverse taper surface.
Note:
An alternative embodiment of this invention incorporates an anti pull out feature which is threaded in form, where an outer part threads over the trapped hose, which may be elastically deformed by having been fitted over an underlying threaded inner part.
A further alternative embodiment of this invention incorporates an anti pull out feature which is threaded in form, where an outer part threads over the trapped hose, which may be elastically deformed by having been fitted over an underlying threaded inner part.

It is envisaged that the principles behind the mechanism of the present invention can be used in a variety of situations. For ease of reference however the mechanism shall be illustrated with reference to a garden hose fitting. It should be appreciated however that this is not intending to be limiting. Also, it should be appreciated that the present invention could cooperate with prior art technology including complementary threads (such as in a nut) or directly into a material, and could be used to connect many elements including in the fields of furniture, tools, construction, sports equipment, machinery, scaffolding/pipes etc.

The term elastically deformable tube is envisaged to include all tubes which change shape from an original form (even marginally) on application of force, and are biased to return towards the original form on removal of the force. This can include such items as garden hoses, high pressure hydraulic hoses and PE pipe.

In preferred embodiments, the inner portion or part is substantially rigid. By being substantially rigid, the inner portion or part can provide support for the internal walls of the deformable tube, thus ensuring that the bore of the tube remains open. This is a particularly useful feature of the present invention allowing it to be used for connecting conduits such as hoses, pipes and other tubing.

In this embodiment it is envisaged that the outer portion would move while the inner portion remains substantially static to allow entry of the tube past the constricting area of the entry passage.

In this embodiment of the above configuration the outer portion or part have at least part of its construction helical in form.

In an alternate embodiment, it may be that the outer portion or part of the connector may be substantially rigid and that the inner portion may be the part that moves to allow entry of the deformable tube. Preferably however the main portion still has sufficient rigidity to provide support to hold open the bore in the deformable tube.

In some embodiments, of the above configuration may actually have the inner portion or part having at least part of its construction helical in form.

In other embodiments of the present invention it may be that both the outer portion and the inner portion move relative to each other to allow the entry of the tube.

In constructions that include a helical form, the movement of the inner and outer portions relative to each other may be a change in circumferential dimension. For example, if the deformable tube pushes against the constricted portion of the passage, this could either cause a helical inner portion to reduce slightly in diameter, or a helical outer portion to increase slightly in diameter, thus widening the constricting area to allow insertion of the tube.

The use of a helical construction takes advantage of material memory and thus readily provides a bias of the helical portion against the tube once it has entered fully the entry passage.

In other embodiments of the present invention the movement of the inner and outer portions to each other may be a translational movement of at least one of the portions in the direction of a longitudinal access of the tube.

It should be appreciated that typical hose connectors have a static bearing force once the hose is inserted into them. That is, when water pressure is introduced into the hose, there is no reactive force between the hose connector and the hose itself. This can lead to hoses separating from the connectors as a consequence.

To overcome this problem additional threaded sleeves have been introduced to hose connectors, but not with any great success.

A key part of the present invention is that once the translational force is applied to the tube away from the connection head (such as when a tap is turned on, or a person pulls on the hose) either or both the inner and outer portions move as a consequence to bear further force against the deformable tube thus holding it tighter within the connector.

For example, if either the inner or outer portion had a helical formation, pulling the tube away from the connection head (that is a translational force is applied to the tube) causes frictional engagement with the helical part. This frictional engagement causes a circumferential change in the helix as a consequence, lessening the distance between the inner and outer portions, and or reducing the constricting portion towards it's original state, and bearing further force against the deformable tube.

In embodiments which do not have a helical portion, there may be provided frictional engagement from the tube bearing against slopes within the entry passage defined by either the inner or outer portions. Again, the configuration of the connector is such that between them the inner and outer portions bear further against the deformable tube holding it more firmly within the connector.

One of the problems with prior art is that the connectors tend to be very complicated in construction often involving many working/moving parts. This can lead to considerable expenses in tooling and assembly as well as potential complications later on in terms of durability.

A preferred embodiment of the present invention has all of the parts integrally formed into a unitary piece. This is achievable by having the outer and inner portions depending from the connection head. It can be seen that this version has considerable advantages over the prior art.

A preferred use of the present invention is as a hose connector. Therefore, to enable the present invention to connect a hose to a fluid source, it is preferred that the connection head and the inner portion have a bore aligned with the inner bore of the hose or tube once connected.

Further, it is preferred that the connection head is threaded, preferably such that it can be readily connected to a tap or a standard fitting from a fluid source.

It, is also envisaged that the present invention could form part of a kitset which includes the hosing or deformable tube with which the connector is designed to fit.

A more general discussion of the present invention is now given below.

In a general form of this invention configured a spring dovetail mechanism, there is a main body, with an inner supporting part, and an outer locking part. Generally a hose is trapped between the inner and outer parts. Specifically in a preferred embodiment, the hose is expanded over at least one raised area creating a reverse taper lock area. The result is there is a deformed area of the elastic hose trapped between the inner and outer parts.

Whilst simple friction could hold the outer part to the hose and the hose to the inner part, there may be a retaining detail which enhances this force.

1. The retaining detail is a translation-capable outer part separate to the main body. This is an example of a translation dovetail mechanism.
2. The outer part is attached to the main body (although it could be separate) and capable of helical expansion as the hose is inserted, thereby resulting in a helical lock on the hose. This is an example of a spring dovetail mechanism.

The action to insert the hose may be a simple push or a push and turn.

There may be a holding detail that pulls or holds the retaining detail away and then allows release when the hose is in place. For example the hose-fitting could be sold in a "ready-to-release-the-retaining-part" state, so all the user need do is push the hose into the space between the inner and outer parts and the retaining detail is released by the action of pushing in the hose or the user manually releases the holding detail so the retaining detail can bear on the hose.

The simple friction lock will usually be suffice, but can be augmented by any other prior art details such as a thread, barb, crimp or pin. (The outer part could also be forcibly translated over the hose by the user's action.)

The inner part can be in a number of forms as illustrated in the figures:
a. Simple, plain, or parallel form,
b. Tapered form,
c. Reverse taper form,
d. Barbed form (or 2 barbs),
e. Conventional thread form,
f. Curved threaded form,
g. Valley form,
h. Splined form,
Or any combination of the above.

The outer part could be a simple reverse taper, but could also be more complex in the nature for the inner part, perhaps designed to cooperate with a more complex inner part.

Some of the forms can create a robust anti pull out detail, (due to pull force or water pressure), when the outer part traps the hose. Many forms illustrated can create what amounts to a virtual dovetail "ramp" to resist hose pull out.

Referring to helical forms of this invention, it can be noted the rotation direction of easiest removal of a hose for a helical retaining detail will be the same as for insertion. So whereas a normal thread is "right is tight/in" and "left is loose/out", a helical lock is either "right is tight/in but also "right is out/loose", or vice versa. This somewhat surprising observation is due to the nature of springs on rotation.

An advantage of the present invention is simplicity, and inherent robustness. Prior art hose connectors have a minimum of three parts, (body, sprung barbs and threaded nut), but the present invention can be a unitary item, whilst avoiding troublesome threads and being easier to use.

In some embodiments, the aperture in the inner part could serve as a passageway for substances to pass through, as in water through a garden hose, but it should be appreciated that the inner part could also be solid or structural in form or purpose.

Most embodiments of this invention can be configured to be in the form of a self locking mechanism, and specifically a self locking garden hose fitting, but the locking force may be solely by or augmented by another part, or the application of energy, such as heat.

It can be seen that the present invention and all of its embodiments provides significant advantages over prior art.

It should also be apparent that the simplicity of design of the present invention means that the hose securing mechanisms can be relatively easily manufactured using known techniques.

It can also be seen that the present invention can be provided in the form of a kitset including a male and female form designed to work as a pair.

This invention is described here by way of garden hose fittings, but equally the principles of the invention herein can be applied directly to any number of items to be connected, such as for example: fasteners, machinery, sports equipment, scaffolding, tube connection, furniture, toys, and any application where parts need to be secured together temporarily or permanently.

According to one aspect of the present invention there is provided an adjustable connector utilising an interference securing mechanism including at least two parts, wherein an external surface of the main body of a first part is configured to bear against an internal surface of the bore of a second part when the first part is at least partially inserted into the bore of the second part to form a connection.

According to one aspect of the present invention there is provided an adjustable connector utilising a push interference securing mechanism, or "push mechanism", including at least two parts, wherein an external surface of the main body of a first part is configured to bear against an internal surface of the bore of a second part when the first part is at least partially inserted into the bore of the second part to form a connection.

According to a second aspect of the present invention there is provided an adjustable connector utilising a push mechanism including at least two parts, wherein an internal surface of the main body of a first part is configured to bear against an external surface of the bore of a second part when the first part is at least partially inserted over the second part to form a connection.

The general principle of having translation between two parts allowing connection of a tube or shaft can be applied to quite different situations. Most of the following discussion is directed to alternate applications of general principles, mainly towards connecting shafts such as golf clubs, however this should not be seen to be limiting.

A push mechanism is defined in this patent specification as a mechanism where one part is, at least partially inserted in an aperture of a second part, and/or against the second part in some way, and a locking force between the parts, and possibly a third part (or parts), is primarily arrived at by the relative movement of said first and second parts, via a push force on one of the parts. There are several ways this may occur:

1. The push force so applied may initially cause the parts to move apart relatively, until a friction lock is attained. In this case the application of the force is to potentially separate the parts, but the geometry does not allow this to occur and an interference fit is obtained.
2. The push force so applied may initially cause the parts to move together relatively, and thereafter apart relatively, until a friction lock is attained. In this case the application of the force initially moves the parts together, but continued force moves them apart, and then, as above, the force acts to potentially separate the parts completely, but the geometry does not allow this to occur and an interference fit is obtained.
3. The push force so applied may initially cause the parts to move together relatively, until a friction lock is attained.

This invention is in contrast to a pull mechanism such as the aforementioned Rawl™ bolt, where a pull force, arrived at via threaded action, causes the elements to be frictionally engaged.

In the case of the aforementioned push mechanisms, a nail, screw or wall plug, there is a blind hole and the parts are pushed to a frictional engagement via a push force on the inner part. However there are situations where applying a push force on a part into a blind hole is either impractical due to space considerations, or the required force will damage the part being pushed on. For example in the case of a golf club assembly, applying and retaining, a push force on the shaft from the grip side of the head is problematic, and expensive, if a titanium collar is used. However unlike some situations the other side of the golf club is accessible and therefore is possible to design a push force which pushes from the other side.

With the above push mechanisms the push force may be applied by any means for example including impact, rotation of a fastener, a wedge, a lever, a cam. The connection may be permanent or temporary in nature, and may have one position of connection or a number of alternate positions.

A push mechanism may incorporate tapered surfaces between the first and second parts so that the push action causes a taper lock. In this case the generally linear translation, (if the parts have a primary axis), of at least one part causes a taper lock engagement. The part translated may be an outer part and or an inner part.

The taper angle may be any angle. It is noted that taper pins used in industry to lock elements are as shallow as 2 degrees, whereas Morse tapers are more in the order of 16 degrees, but cone clutches as seen in blacksmiths power hammers may have taper angles of 45 degrees or more. The invention described generally uses shallower angles for illustration but other angles may be used between 0 and 90 degrees. Taper surfaces between 5 and 20 degrees are shown in the accompanying drawings.

This invention describes embodiments of taper angles which are more complex than matching simple conical arrangements such as:

1. The surfaces have taper angles where at least one of the surfaces is non linear (curved, multiple angle, stepped)
2. The engaging surfaces have taper angles which do not match, so for example the male taper angle is 10 degrees and the female part is 8 degrees. This can be used to apply differential forces to parts as the parts move together under securing push force
3. The parts are finished in different ways so one is for example with: a mirror finish, spline, helical deformation, deformed oval cross section, or other such deliberate variation from a simple taper surface.

When a taper engagement occurs there may be a generally radial expansion of an outer sleeve element as a result of the generally linear movement of a second inner part pin used, via the application of a push force to the inner part directly or indirectly. However whilst the invention described generally uses a push force on the inner part, this is merely for illustrative purposes and the push force could be applied to either part or both parts.

Generally linear movement of a second outer sleeve element could be achieved via the application of a threading, push, or pull force to the sleeve, directly or indirectly.

Pull forces can be used in cooperation with push forces in hybrid mechanisms, with a mixture of push and pull forces, so that in the first example a push force could act on the sleeve whilst a pull force could act on the pin.

In any of the above cases one or more surfaces may be beneficially threaded, tapered or with an anti-rotation detail such as ridges and grooves, or non circular cross sections including polygons and ovals. These details could serve to either, or both assist in anti rotation resistance under load, or to aid setting of the relative positions of the parts to each other or other adjacent details.

An alternative embodiment is to deliberately use materials for the engaging parts where the density of the materials, or compressibility of the materials, differs so that as the locking force causes the frictional taper lock, one part will be deformed elastically or plastically, perhaps into an adjacent recess, but in some way into a new cross section.

For example if an oval cross section pin pushed into a circular section aperture, of a similar taper angle, in an adjacent sleeve, it will cause one of the following to occur:
1. If the pin is made of a more robust material the pin will cause the sleeve to deform plastically, or change its cross section.
    (This plastic deformation could be sufficient to permanently secure parts via the new deformed shape, or reversible if lesser locking load is used, for non permanent connection.)
2. If the pin is made of a less robust material the pin will deform plastically, or change its cross section.

Plastic or cross sectional deformation in a taper lock situation as described herein can be used to achieve better anti-rotation resistance. Whilst this invention describes the use of plastic or cross sections deformation for push mechanisms, this is not limited to push mechanisms. Therefore this invention describes the use of taper lock details which incorporate at least one cross section which does not match the adjacent part.

A general advantage of push mechanisms is that there are materials which survive load better under compression than load under tension. So in the golf club example described herein it is more likely the parts may be made more conveniently, quickly, accurately, and cheaply via injection moulding of plastics as opposed to machining metals.

The push term refers to the general translation of one part relative to the other, and could be taken to only include simple linear translation (along an axis) or other forms such as helical rotation, or composites.

A push mechanism may use a simple "interference fit", frictional engagement, to lock elements, or be used in conjunction with other securing details.

Generally the application of force will lead to securing, but alternatively a self locking variation could be used where the movement of the pin or sleeve causes releasing. In this latter case the parts are locked in their default state and the action of a tool will lead to loosening the parts to allow adjustment.

The application of the locking or releasing force to the part or parts of a push pull variation can be by any means including:
1. A threaded fastener which pulls back towards a fixed detail or part (For example: perhaps passing through a hole in the bottom of a golf club hosel, so it may be accessed from beneath),
2. A threaded fastener which pushes against the pin, for example, where the fastener is threaded into an adjacent fixed detail or part (For example: perhaps passing through a hole in the bottom of a golf club hosel),
3. A threaded fastener which pushes against the pin, and actually thread ably engages into the end of the pin, for example, where the fastener is threaded into an adjacent fixed detail or part (For example: perhaps passing through a hole in the bottom of a golf club hosel),
4. A wedge detail, perhaps integral,
5. A lever detail, perhaps integral,
6. A spring or spring detail, perhaps integral,
7. A cam detail, perhaps integral,
8. Any other force such as a driven hit with a hammer.

According to one aspect of the present invention there is provided a connection system including
a shaft with an expanded circumferential region at one end, and
a sleeve having an entry region at one end, a constricting area within the sleeve,
and an expansion section at the opposite end to the entry section,
the connection system characterised in that
the relationship between the shaft and the sleeve is such that on application of force to the shaft to push the expanded circumferential region past the constricting area, the expansion section widens from a rest position to open the constricting area and allow entry of the expanded circumferential region into the expansion section, and
once the expanded circumferential region has passed the constricting area, the expansion section biases towards its original rest position.

For ease of reference, the expanded circumferential section should now be referred to as a knob.

It should be appreciated that the sleeve is configured relative to the shaft such that the shaft (apart from the knob) is smaller circumferentially than the constricting area when the sleeve is in its rest position. It is only on attempting to push the knob through the constricting area that the sleeve expands outwards to allow the knob to pass into the expansion section. Once this has been achieved, there is no further force on the sleeve which is then allowed to relax back towards its original rest position.

The sleeve may be expanded in a variety of means. In one embodiment the sleeve may include a series of slots extending from its end towards the constricting section. The slots enable outward movement of fillets defined by the slots thus effectively widening the expansion section and allow entry of the knob therein.

A preferred embodiment would include a single slot that extends from one end to the other, creating a "c-shaped" form, which may expanded to allow the knob to be inserted In preferred embodiments of the present invention there is also provided an outer portion configured to receive the sleeve. In some embodiments this outer portion may be the object to which the shaft is ultimately meant to connect to such as a socket. For example, the shaft may be the shaft of a golf club and the outer portion may be the hosel of a golf club head.

In some embodiments of the present invention there may be provided interacting protrusions between the sleeve and the outer portion. These can act to further prevent pull back of the sleeve relative to the outer portion and hence the shaft also contained within the sleeve relative to the outer portion.

A preferred embodiment is where the shaft is pre-assembled into the sleeve, and the knob and restricting areas of these parts are configured (with one or more tapers for example) so any attempt to remove the shaft from the sleeve will necessarily require some expansion of the internal (and therefore exterior) dimensions of the sleeve in, at least the area of the constricting area, so as to allow the knob to pass the constricting area. The following general sequence may occur when using this assembly:

1. Insertion Sequence:
   a. The shaft-sleeve assembly is inserted into the bore of the outer portion.
   b. With continued insertion a protrusion detail on the outer surface of the sleeve may click-fit into a recess detail in the inner surface of the bore of the outer portion (or through the bore entirely).
2. Removal Options:
   a. An attempt to remove the shaft-sleeve assembly, by grasping the shaft, will cause the protrusion detail to move outwards, so as to jam into the recess detail, and the removal attempt will be unsuccessful. In fact more force will make things worse, (which of course means the connection is secure under load.) A more subtle approach will work though:
   b. If the user should grasp the sleeve only, the assembly will be able to be removed by pulling on the sleeve part only. (This will be facilitated if the user makes sure the shaft within the sleeve is a little loose in the sleeve, thereby allowing the sleeve with the outer protrusion to collapse in and not be fouled into the recess in the bore)

According to another aspect of the present invention there is provided a push mechanism, together with a part or detail to facilitate the application of the force (such as a fastener).

An applied push force, via a force application part (such as a fastener), acting on at least one push pin, may serve to lock or unlock parts, or an applied pull force, via a force application part (such as a fastener), acting on at least one pull pin, may serve to lock or unlock parts.

This patent describes an unlocking sequence where the removal of the locking push force followed by a tap to the parts (if required) causes the release of the frictional interference lock.

According to another aspect of the present invention there is provided an adjustable connector substantially as described above wherein, in use, the connector connects two or more objects such that rotation of one part of the connector with respect to the other changes the orientation of the objects with respect to one another.

In some embodiments a bore (or a main body) may include a spline, key detail, and/or ridges/grooves to limit rotation of the bore with respect to an object (such as the main body of another part or an object to be connected) in contact with it.

In a preferred embodiment at least one part includes marking configured to indicate the orientation of the part.

In a preferred embodiment at least one part is configured as an auto locked mechanism.

Reference to an auto-locked mechanism throughout this specification should be understood to refer to a mechanism which by design, and by default, secures the elements (which may be telescoping) relative to each other. Typically an auto locked mechanism includes a body made from a deformable material. The body is designed such that a tool is required to change the shape of the body so as to accept an object to be connected, and such that the body locks onto the object when the tool is removed.

Throughout this specification the term deformable material should be taken as meaning a material which is able to deform from its original shape, and has a resilience or bias to return to its original shape, i.e. the deformable material has a material memory.

In the case of a deformable self locked mechanism there may generally be an aperture for a tool and a tool designed to deform the body. This tool may be a:
1. lever
2. wedge
3. cam (elliptical or otherwise)
4. threaded element (tapered or otherwise)
5. conical element (solid, threaded, expandable or otherwise)
6. a drivable connection (egg a pin or taper)
7. an external tool such as modified pliers
8. application of heat to thermally expand an aperture or weaken a mechanical connection In a preferred embodiment at least one part is deformable.

In a preferred embodiment at least one part has an internal bore. This part may be the pin and the bore of said pin may be configured to have a golf shaft glued or connected into it. This pin may have at least one tapered outer surface of any angle, where said tapered surface is narrower in cross section towards the grip end of the golf club, or alternatively, wider to the grip end. Alternatively there may be two tapers in each direction.

This invention describes the use of alternate click-on/click-off sleeves which have different indexing detail and/or other characteristics. For example a simple indexed sleeve with just one setting, could be replaced with a more complex nine setting sleeve.

In a preferred embodiment at least one part is made from a deformable material.

In a preferred embodiment at least one part includes a slot.

Reference to a slot should be understood to refer to a gap that extends through the external surface of the part into the bore and at least partially along the length of the bore.

In some embodiments the slot may extend at least partially along and around the part.

In other embodiments at least one part includes a deformable insert.

Preferably the second part of the adjustable connector is an auto locked device. In this embodiment the main body of the second part is made from a deformable material, including a slot. The slot may be helical, straight or otherwise, and extend partially or fully along the main body of the part.

The use of an adjustable connector may be illustrated by application to a golf club. However, those skilled in the art will appreciate that there are many other examples that could be used and that reference to a golf club only should not be seen as limiting.

In a preferred embodiment the object to be connected is the shaft of a golf club.

In a preferred embodiment the object to be connected is the club head of a golf club.

Preferably the shaft of the golf club is connected to the bore of the first part of the connector, and the club head is connected to the main body of the second part. This arrangement recognises that the bore of the first part may be readily configured to connect with a shaft, while the hosel in the club head may be readily configured to connect with the main body of the second part. However, in other embodiments the shaft may be connected to the main body of the second part and the club head connected to the first part (for example by forming an extension on the club head configured to connect with the bore of, the first part).

In a preferred embodiment at least one part is releasably connected to an object to be connected.

The advantage of a releasable connection is that the object may be released if subsequent re-adjustment is required. This may save time and effort in making the adjustment, as well as reducing the likelihood of damage to the object or adjustable connector, in each case saving cost.

In a preferred embodiment the releasable connected part is connected by an auto-locked mechanism.

For example the hosel of a golf club may be configured to include an auto locked mechanism.

The hosel, and/or club head (where there is no hosel for example), may have one or more slots, helical, straight or otherwise, partial or full, and be of sufficient strength either as a unitary item or via the design and/or cooperation of multiple elements (which could include a conical, wedge, split or spring element for example). A suitable tool may be used to expand the hosel so that it may accept a part of the adjustable connector, with the part becoming locked in the hosel when the tool is removed.

Likewise, the shaft of a golf club may be configured to include an auto locked mechanism. The shaft may be made of a deformable material and include a slot such that operation of a suitable tool may open the shaft so as to accept a part of the adjustable connector. The shaft may be self lock to the part on an interior or exterior surface part.

Where the hosel is a deformable body or where the shaft is a deformable body each may be designed so as to auto lock or otherwise frictionally engage with a part of the adjustable connector.

Throughout this specification the hosel may be taken to include any element in contact with itself. Likewise the shaft may include any element in contact with itself. An intermediary element (such as an adjustable connector) which connects the club head and or hosel with the shaft can be taken to be a shaft in some cases and a hosel in others.

BEST MODES FOR CARRYING OUT THE INVENTION

Further aspects of the present invention will become apparent from the examples in the accompanying drawings, which are integral parts of this invention disclosure:

FIGS. 1 to 15 show the versatility of the invention via a number of hose connectors, each in two views, where there is a generally inner solid part and a generally outer part, and the locking action involves at least one of the following:

a. The helical expansion of an outer part, and subsequent resultant lock of an inserted hose,
b. The translation or helical deformation of an outer part as a result of hose insertion or attempted hose insertion, which allows further insertion of the hose to occur, and subsequent frictional engagement between the hose and a surface otherwise,
c. The translation or helical deformation of an inner part as a result of hose insertion or attempted hose insertion, which allows further insertion of the hose to occur, and subsequent frictional engagement between the hose and a surface otherwise,
d. The expansion of a hose over at least one area of an inner part where at least part of the inner part has an outside diameter which is the same or greater than the inner diameter of at least part of the hose (the hose not shown here, but shown later figures),
e. A servo assisted lock where as the hose is pulled or pushed (mechanically or perhaps by water pressure) the frictional engagement of at least part of the hose on at least part of a part will be increased
f. A threaded surface which deforms or slightly cuts the hose as it is engaged,
g. A tapered surface engagement where the hose is frictional engaged to said tapered surface in some manner additionally restrained,
h. An arrangement where there is a helical locking part complemented by a threaded engagement, which may be single start or multi start, or sharp or organic in thread pattern/form.
i. An arrangement where there is a first helical locking part complemented by at least a second helical locking part, or other locking/engaging detail, configured so that the first helical part resists rotation in an opposite direction o the other
j. A threaded outer part which can threadably translate and cause a taper lock on to an inserted hose which has been deformed over a raised part of the inner part, for example a barb or ridge.

FIG. 16 shows a prior art form 11 which can be fitted to, or contiguous with, a hose connector embodiment of the invention 10 where the connector has an outer part 12 and an inner part 13 which may be fitted with hoses 14 (of light standard or heavy section), where the light section hose is able to be inserted into a deeper area 15 and helically lock, to the overlying part 16, but the heavy section may not be inserted so far, but will gain more lock force from servo assisted outer end FIG. 17 shows a hose connector with a middle locking part 17 which fits over or into (as shown here) a main connector part 18. The locking part can translate to the left as the hose (not shown) is inserted and creating enough room for it to pass the narrow restriction area 20. As the hose is inserted it will elastically deform over the areas in the following order: 21 22 23 24, and as it does so will eventually move the middle locking part 17 to the left in the figure, so that the recess 25 will reduce in size 26. The net result will be the hose will de formed into a reverse taper form by the slopes 21 22 23 and be locked in the position by the restraint of the overlying locking part 17. The application of any subsequent pull force from the right 28 (or water gas pressure within) will actually increase the lock FIG. 18 shows a helical form hose connector with a hose inserted fully.

FIG. 19 shows the assembly of FIG. 18 with the hose being progressively inserted (and deformed as it goes) from A to D.

FIG. 19 D is the exact same representation as shown in FIG. 18.

FIG. 20 shows a helical form hose connector with a hose inserted fully, where the helix is longer and the hose is deformed up a ramp.

FIG. 22 shows a connector with an elastomer type insert 29 tin the helical slot of the main body, which will add strength and protect against debris entering the connector.

FIG. 23 D is the exact same representation as shown in FIG. 22.

FIG. 23 E shows that the initial aperture 30 is an example of a constricting area which may be smaller than the hose wall thickness 31. The progression of the hose may be facilitated by helical deformation of the outer part and or translation of the outer part.

Figure 1A:
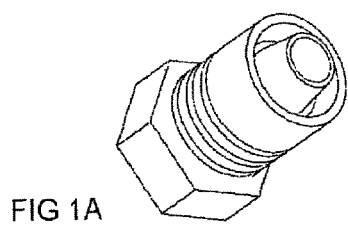
Figure 1B:
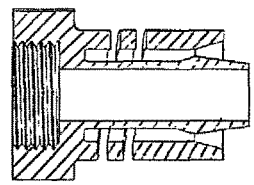
Figure 2A:
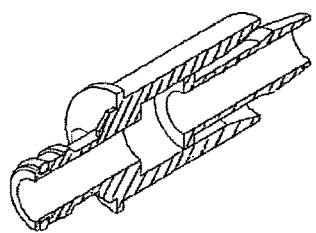
Figure 2B:
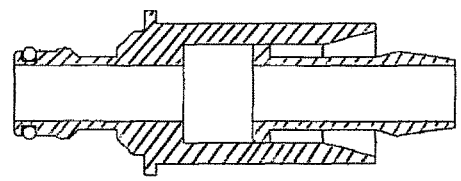
Figure 3A:
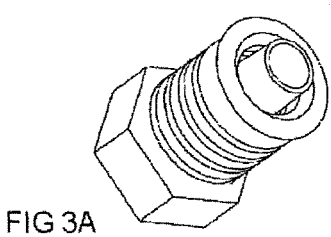
Figure 3B:
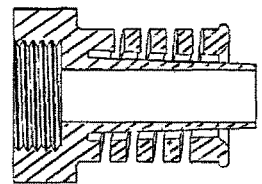
Figure 4A:
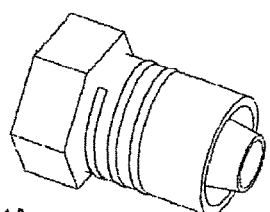
Figure 4B:
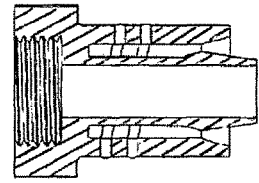
Figure 5A:
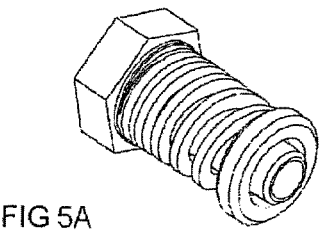
Figure 5B:
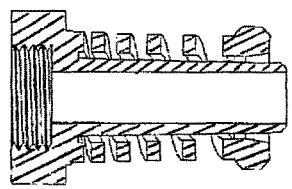
Figure 6A:
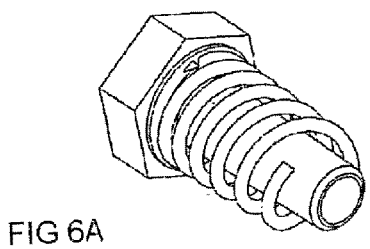
Figure 6B:
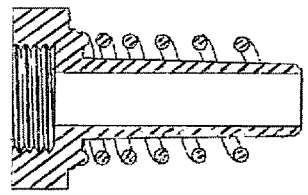
Figure 7A:
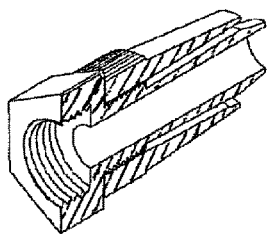
Figure 7B:
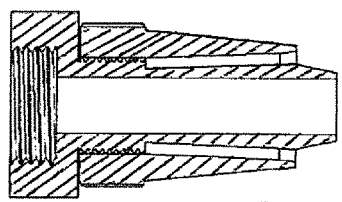
Figure 8A:
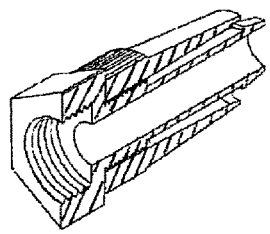
Figure 8B:
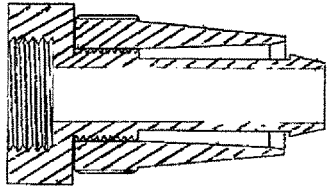
Figure 9A:
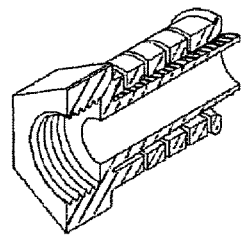
Figure 9B:
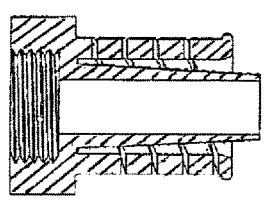
Figure 10A:
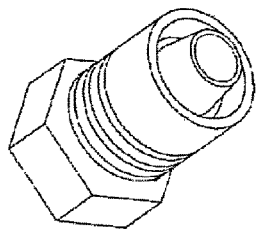
Figure 10B:
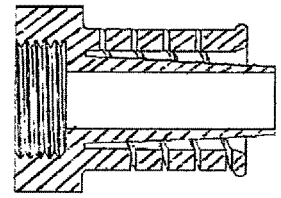
Figure 16A:
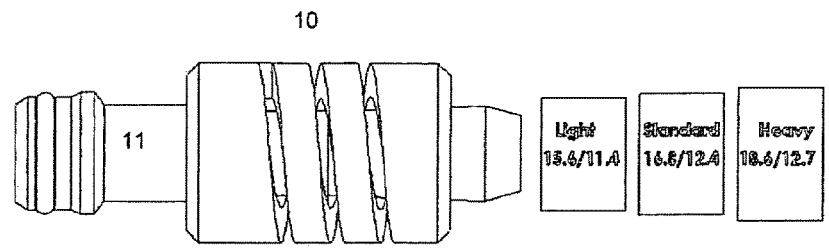
Figure 16B:
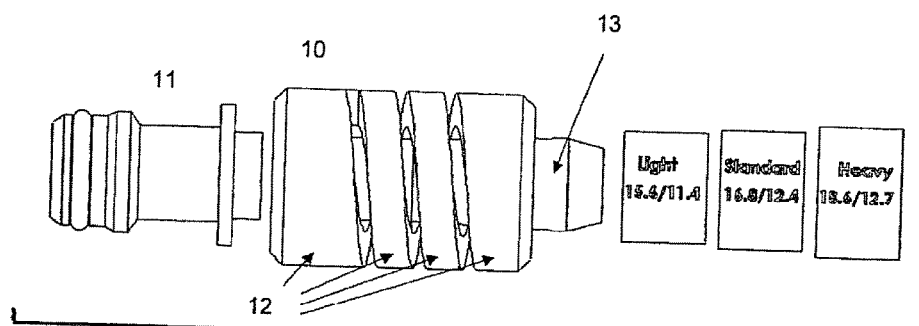
Figure 16C:
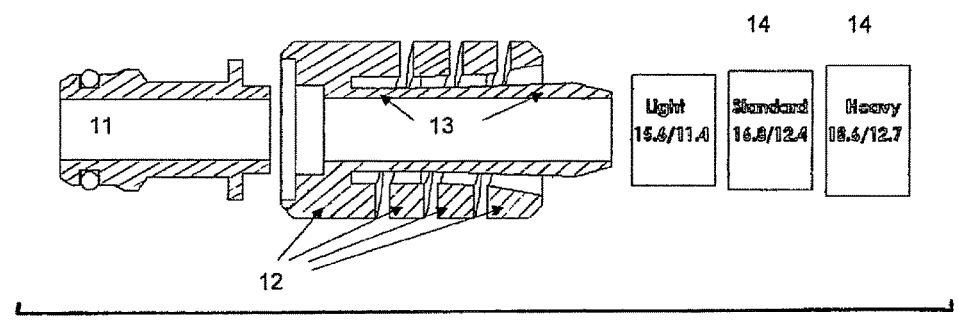
Figure 16D:
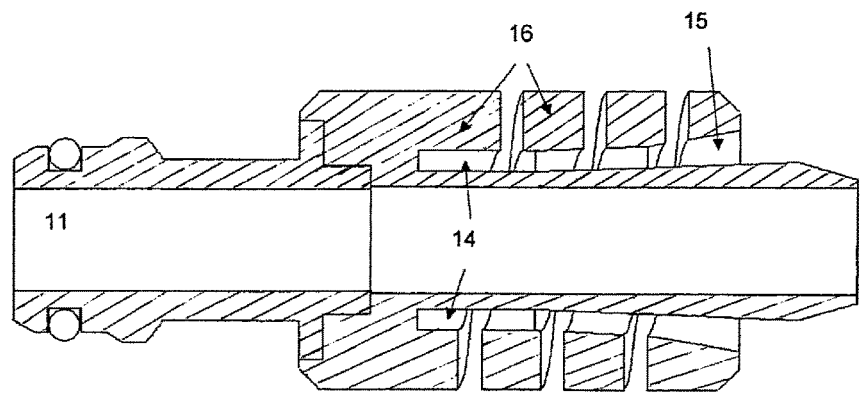
Figure 17A:
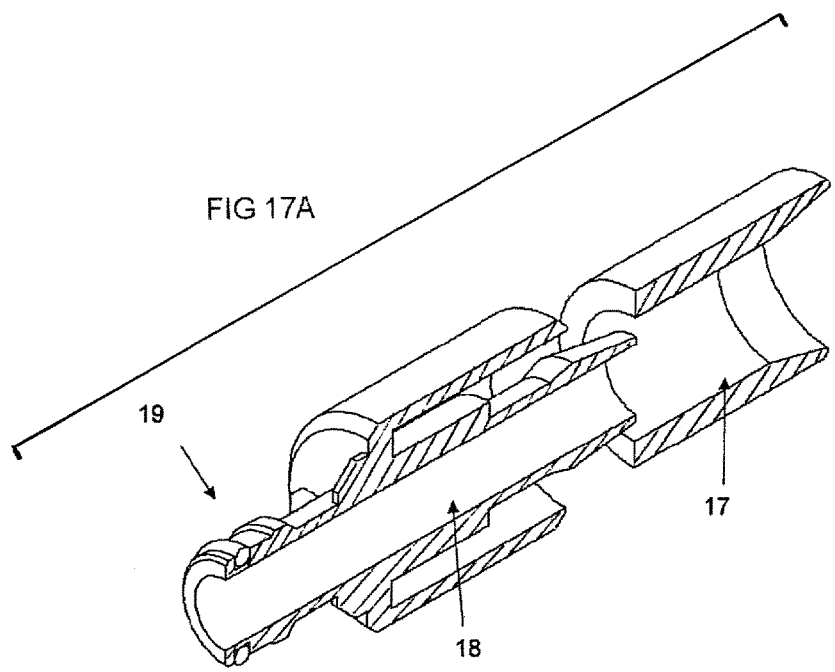
Figure 17B:
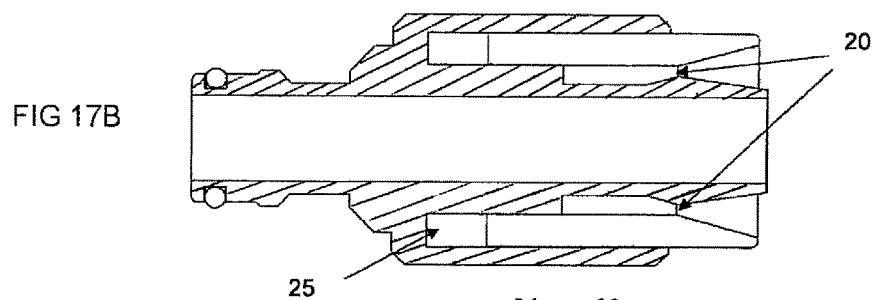
Figure 17C:
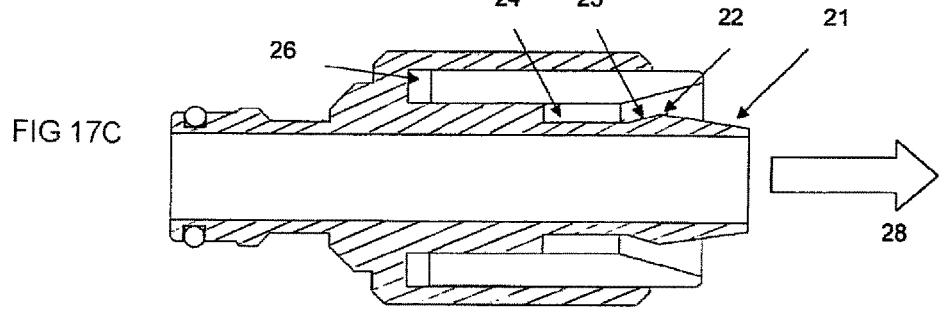
Figure 19A:
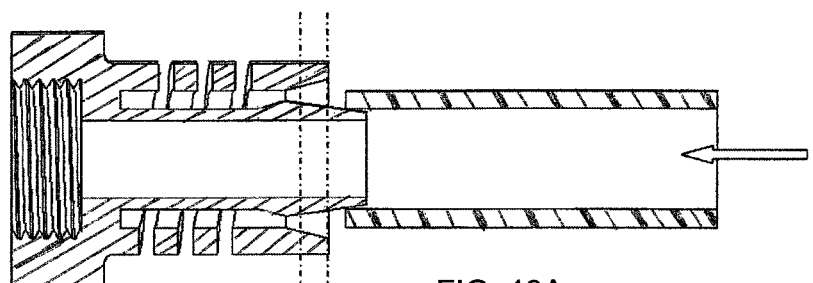
Figure 19B:
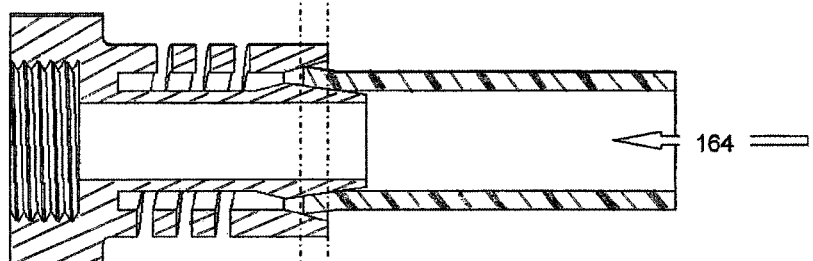
Figure 19C:
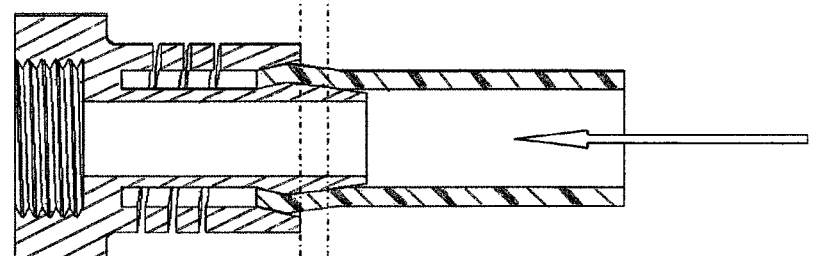
Figure 19D:
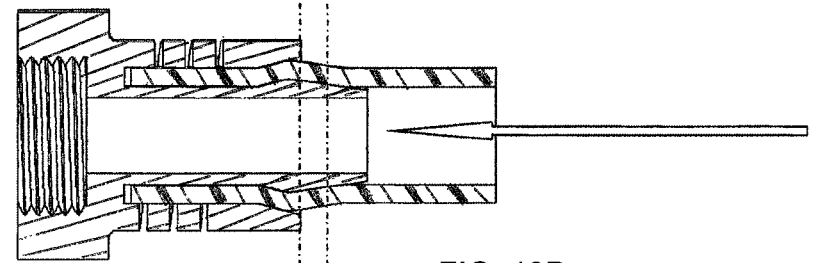
Figure 21A:
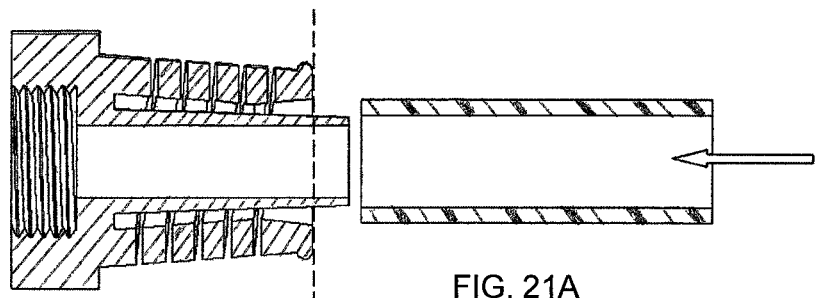
FIG. 21 shows the assembly of FIG. 20 with the hose being progressively inserted (and deformed as it goes) from A to D.
FIG. 21D is the exact same representation as shown in FIG. 20.
Figure 21B:
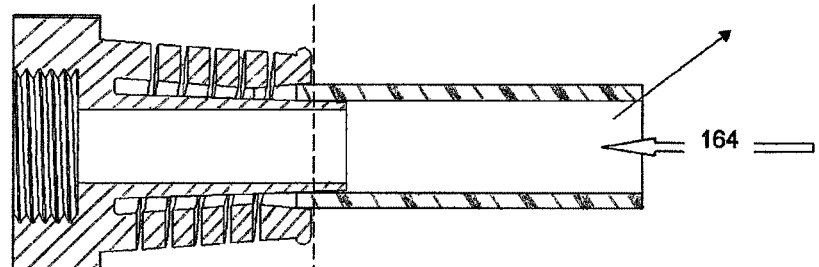
Figure 21C:
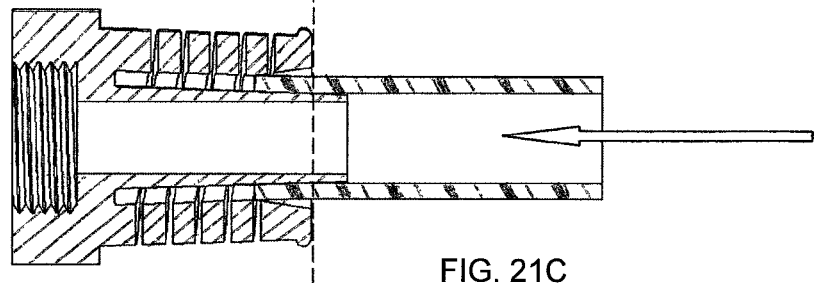
Figure 21D:
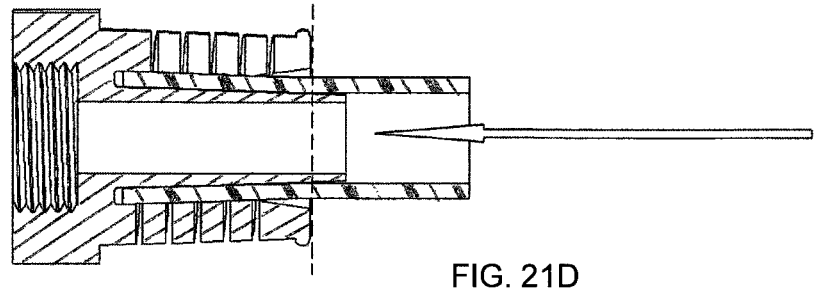
Figure 23A:
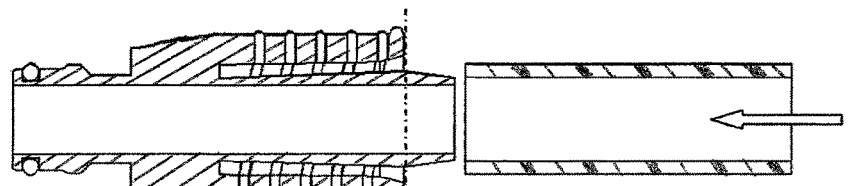
FIG. 23 shows the assembly of FIG. 22 with the hose being progressively inserted (and deformed as it goes) from A to D.
Figure 23B:
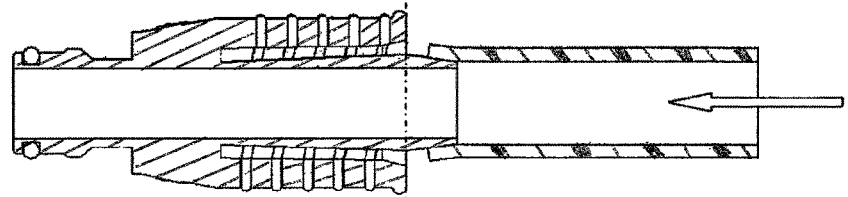
Figure 23C:
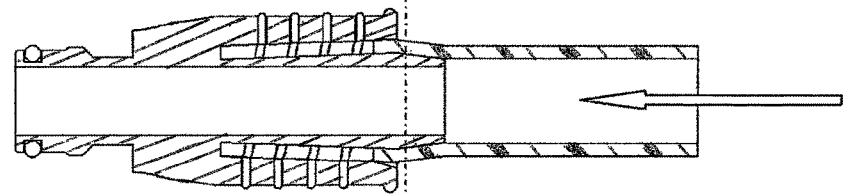
Figure 23D:
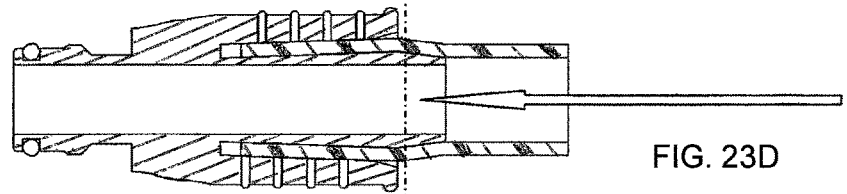
Figure 23E:
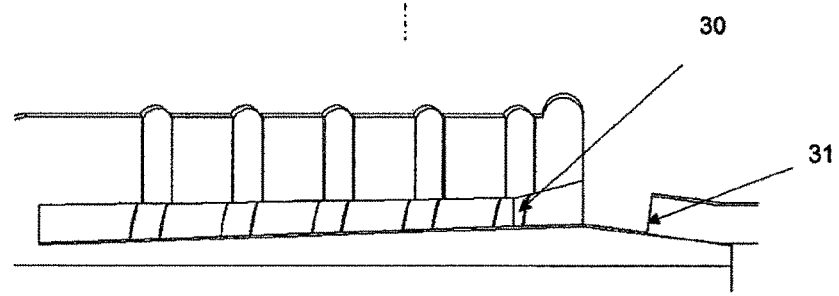
Figure 24:
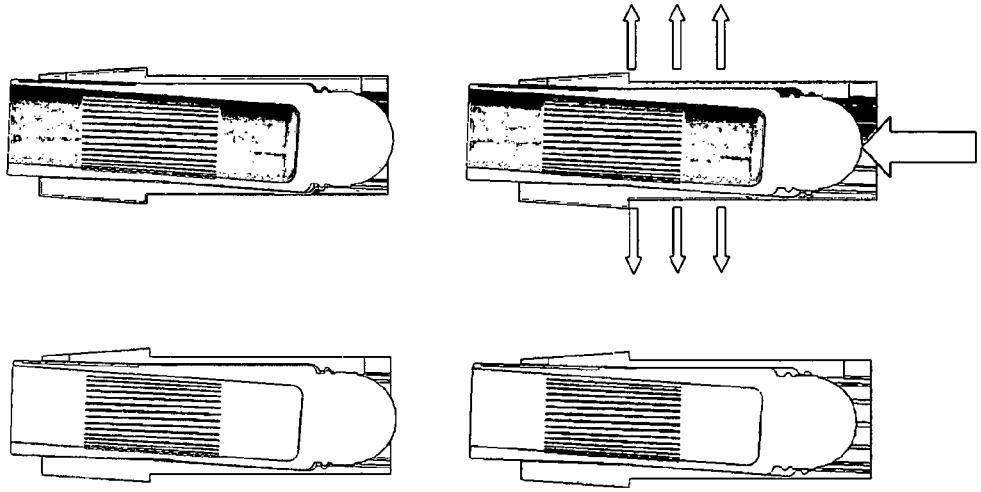

FIG. 24 shows a push mechanism where the inner part may be a shaft or receive a shaft, and the parts are engaged and a representation of the direction of the force to be applied to the pin (large arrow), which as the force is applied will lead to transition of the pin to the left within the sleeve and therefore also lead to radial expansion of the sleeve in the direction of the small arrows.

Figure 25:
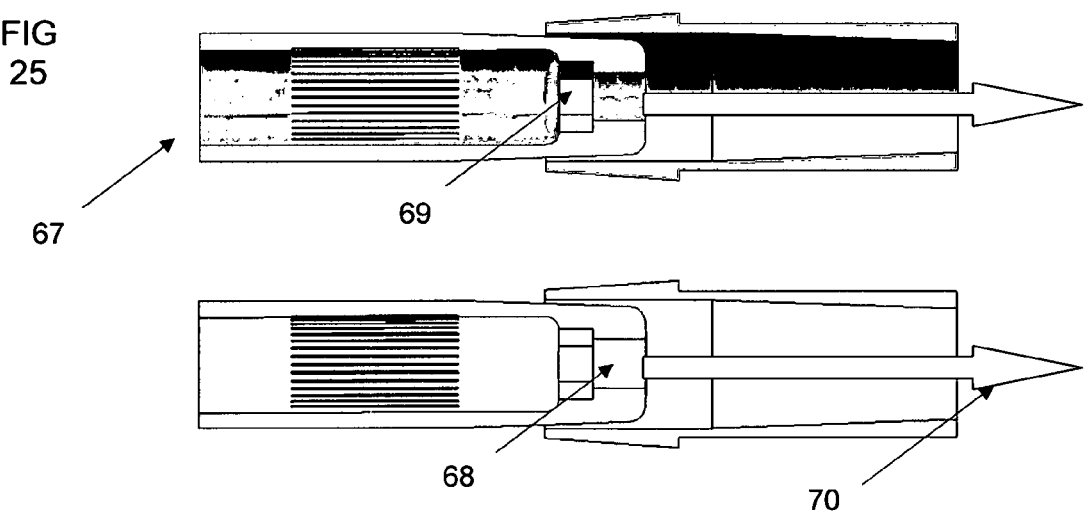

FIG. 25 shows a pull mechanism where the inner part may be a shaft or receive a shaft, and the parts are engaged and a representation of the direction of the force to be applied to the pin (large arrow), which as the force is applied will lead to transition of the pin to the right within the sleeve and therefore also lead to radial expansion of the sleeve in the direction of the small arrows.

Figure 26:
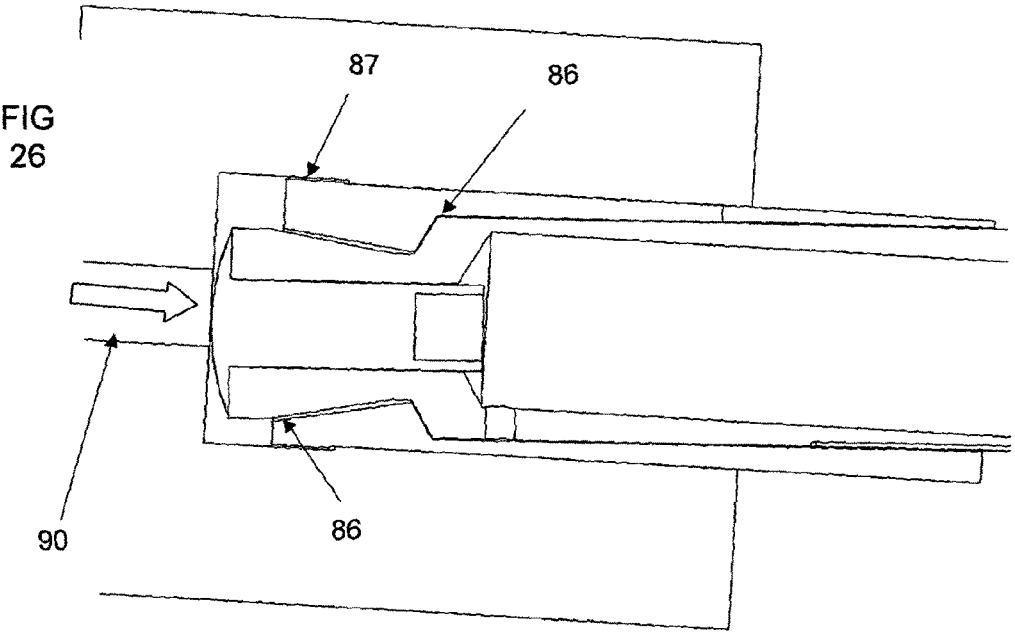

FIG. 26 shows a push mechanism sleeve and pin pair, where the pin taper angle is 10 degrees and the sleeve taper angle is 9 degrees, within a representative golf club hosel. The taper surfaces are apart and not yet engaged frictionally, and the small arrow indicates the force direction which would cause engagement to occur on an outer part (not shown).

Figure 27:
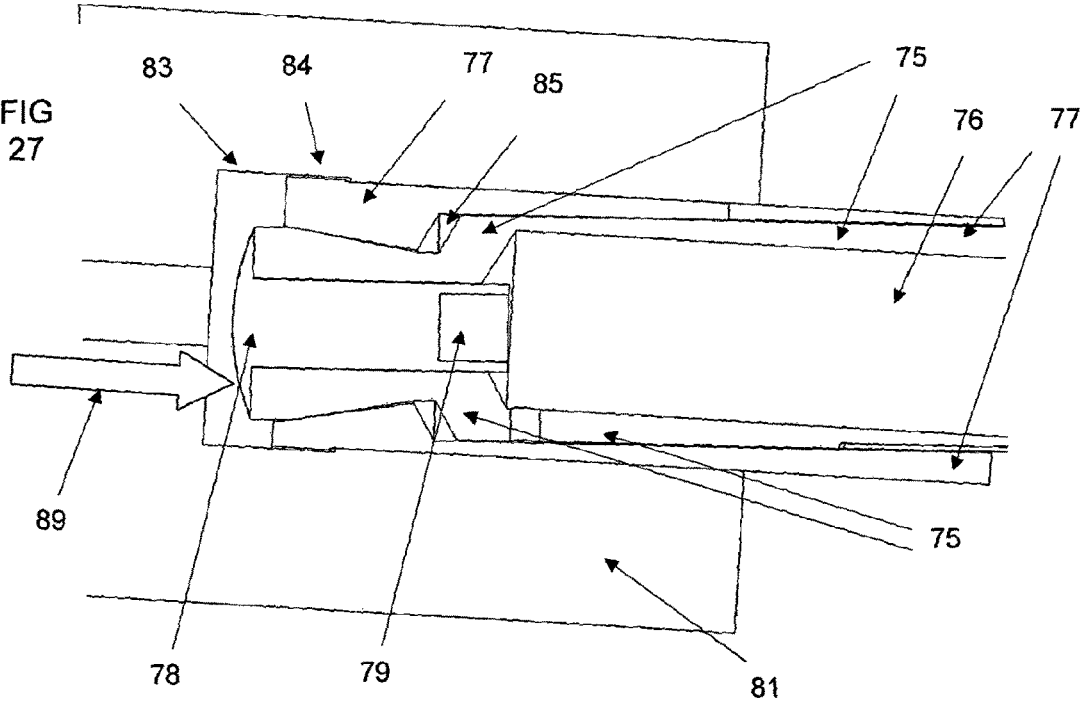

FIG. 27 shows the parts in FIG. 19 where a force has been applied further so as to engage the taper forces frictionally. Additional force from this point on would cause radial expansion of the outer part, and or deformation of, one or both, the pin and sleeve.

Figure 28A:
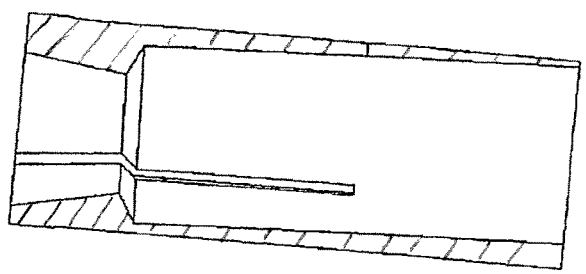
Figure 28B:
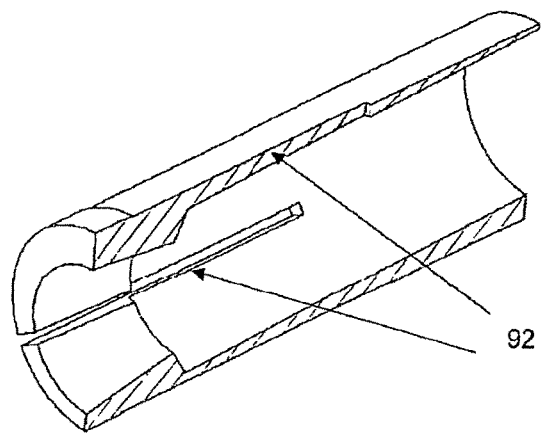
Figure 28C:
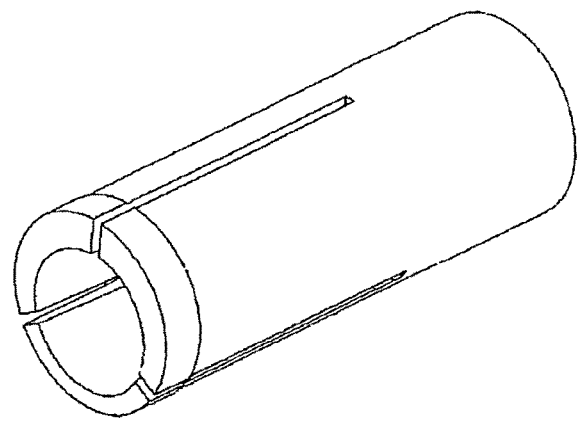

FIG. 28 shows a representative sleeve part in three views, including two cross sections.

FIG. 29 shows a representative outer part in a cross section view, where the bore is larger at 93, than at 94, which can be used to create a "virtual dovetail", as defined herein.

FIG. 30 shows a close up of FIG. 29.

Figures 31A, 31B:
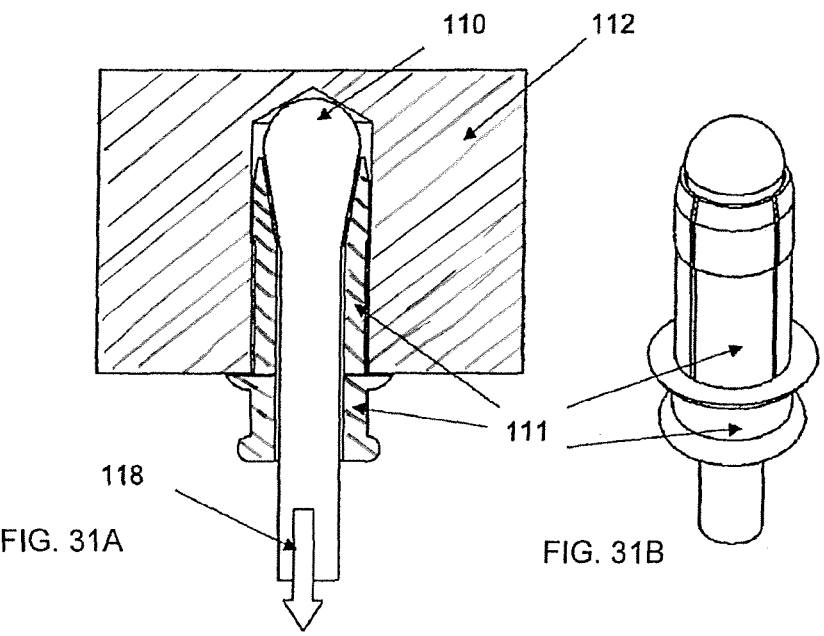
Figures 31C, 31D:
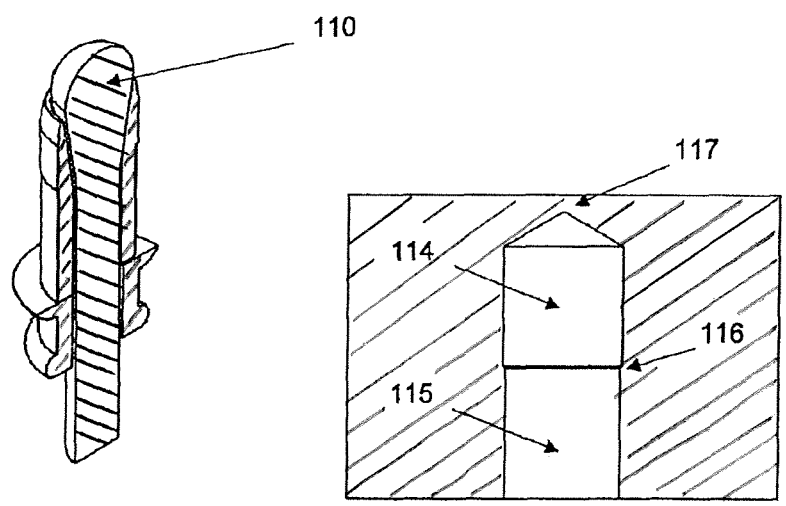

FIG. 31 shows virtual dovetail assembly, where translation of a loose fitting shaft or inner pin (110) having an expanded circumferential region (or knob), can cause radial expansion of a expansion section if a sleeve part (111), into a recessed larger diameter bore area (114) (or socket), the "locking recess", in an Outer part (112), (where the outer part also has a smaller diameter bore area (115)), thereby creating a dovetail feature resisting pull out of the pin or sleeve.

FIG. 32 shows a virtual dovetail assembly where a push force (123) may be applied, and or a pull force (124).

FIG. 33 shows a virtual dovetail assembly where there is an anti rotation detail in the pin (121), and a cooperating detail (122) in the outer part.

Figure 34A:
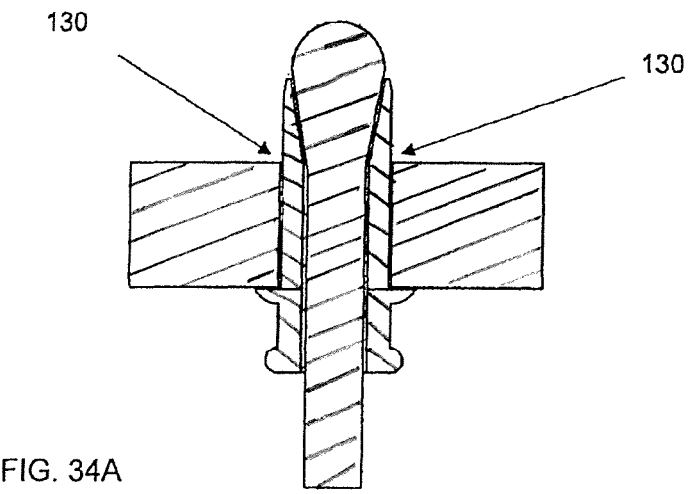
Figure 34B:
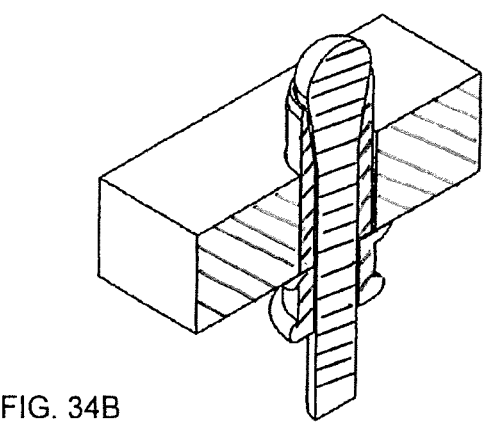

FIG. 34 shows a representation of prior art, in the nature of a wall plug, and highlights the area 130 prone to damage.

Figure 35:
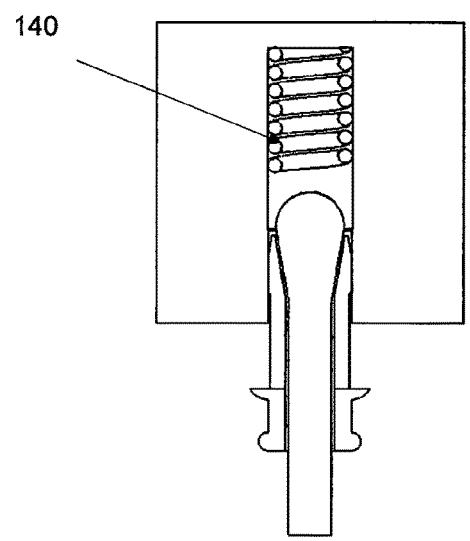

FIG. 35 shows a virtual dovetail assembly where there is trapped spring 140 within the assembly.

Figure 36:
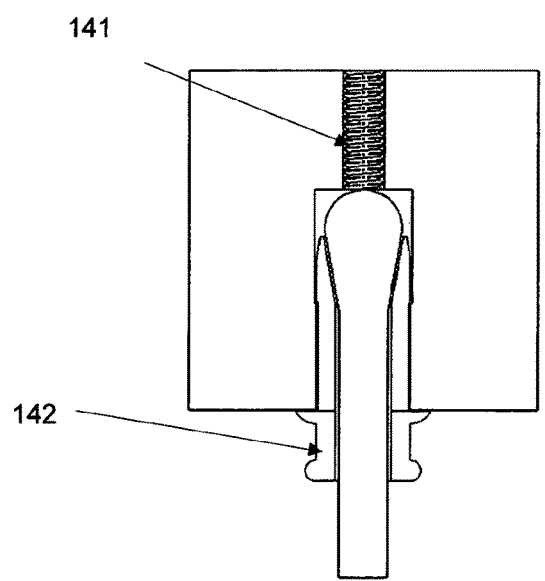

FIG. 36 shows a virtual dovetail assembly which has a threaded aperture 141 in the outer body so a push force may be applied, and has a convenient grip detail 142 on the sleeve so the sleeve may be pulled on to disengage the sleeve and pin parts from the outer body part.

Figure 37:
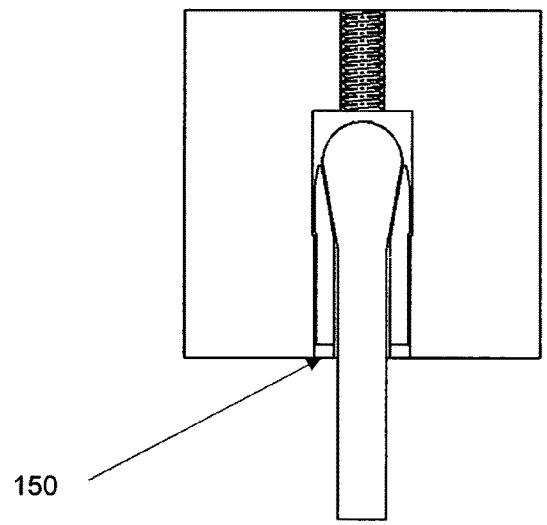

FIG. 37 shows a virtual dovetail assembly where the sleeve part cannot be grasped, being within 150 the outer body part entirely therefore affording an enhanced security aspect.

Figure 38:
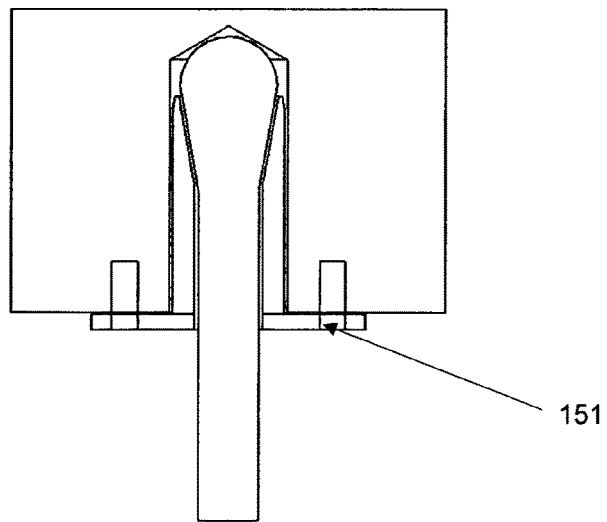

FIG. 38 shows a virtual dovetail assembly where the sleeve part is secured to the outer body part via fasteners (not shown) in apertures 151.

Figure 39A:
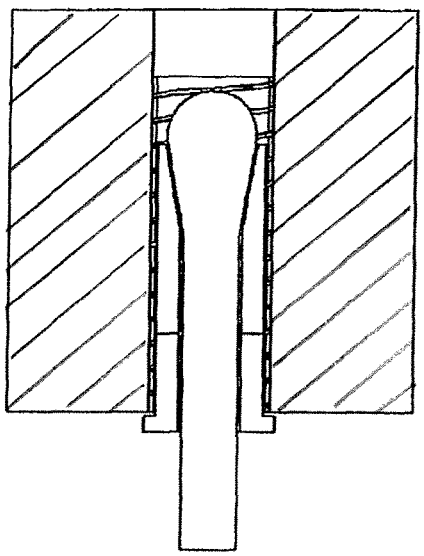
Figure 39B:
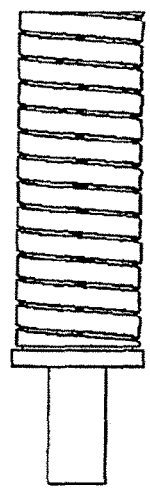
Figure 39C:
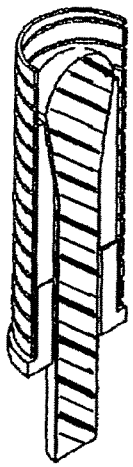

FIG. 39 shows interference assembly where the pin has a helical sleeve part 160 located between it and the outer body part, where the helical sleeve is capable of an interference fit to both the pin and outer body part.

Figure 40A:
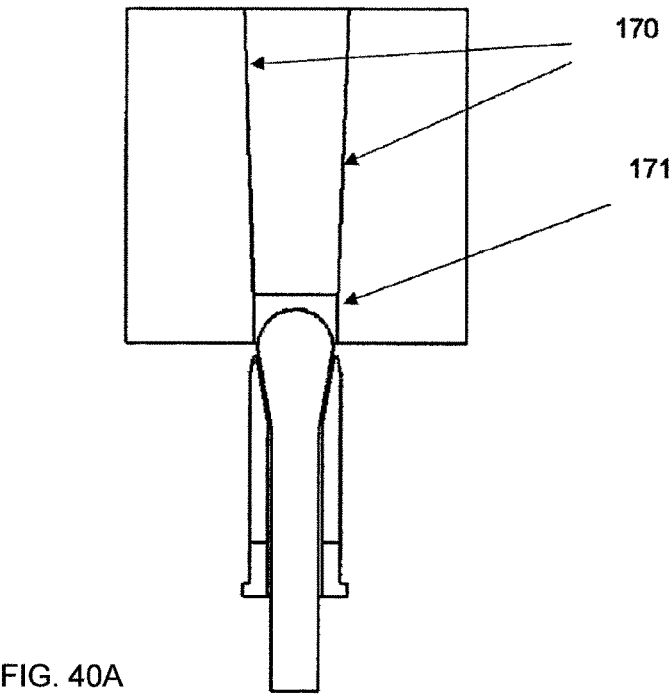
Figure 40B:
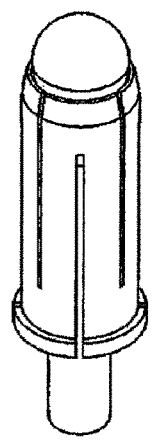
Figure 40C:
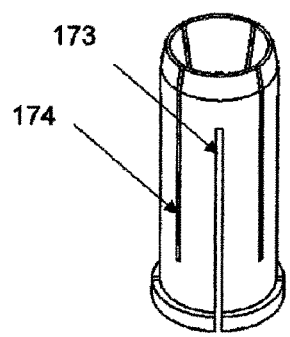

FIG. 40 shows an actual dovetail assembly where the outer body has a reverse tapered area 170 and a parallel area 171, and the sleeve is capable of contraction for assembly; and then subsequent expansion. The sleeves flexible character here is due to the presence of at least one slot, in this case from two ends as shown 173,174.

Figure 41A:
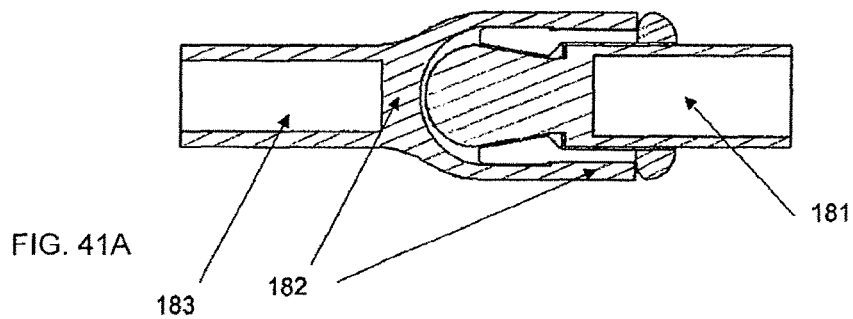
Figure 41B:
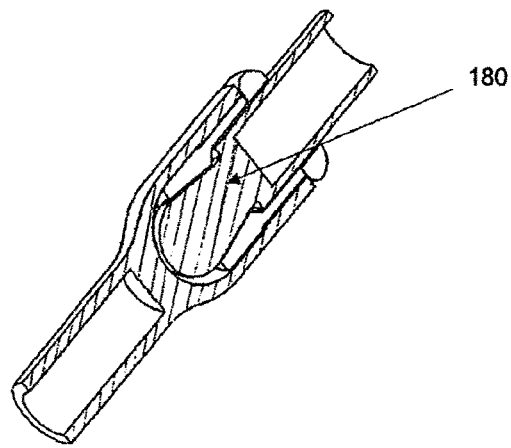
Figure 41C:
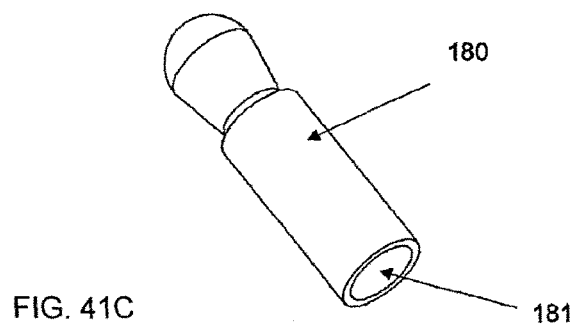
Figure 42:
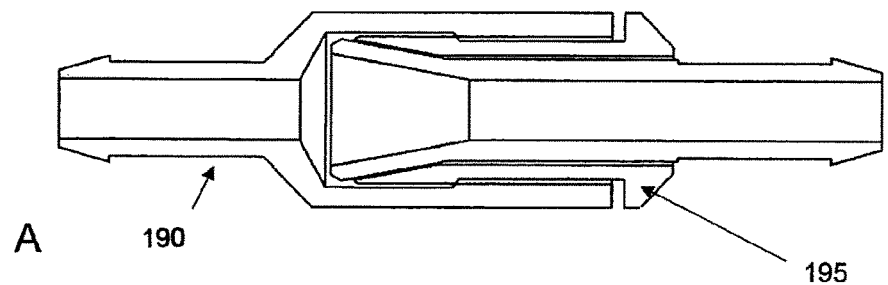
Figure 43A:
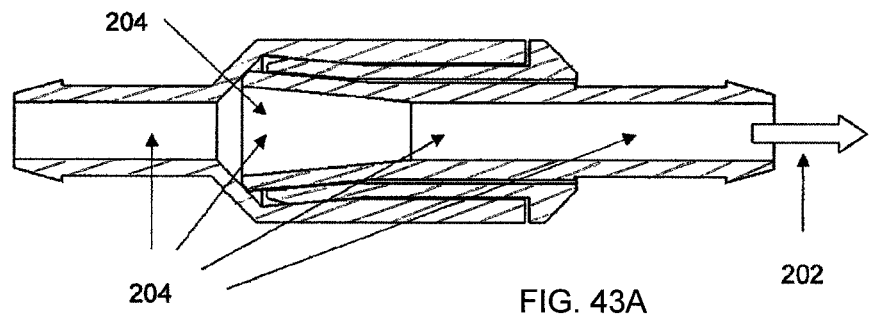
Figure 43B:
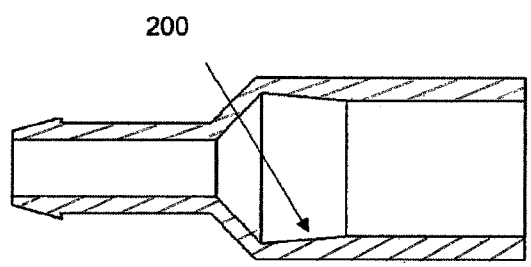
Figure 43C:
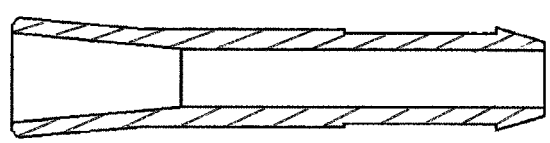
Figure 43D:
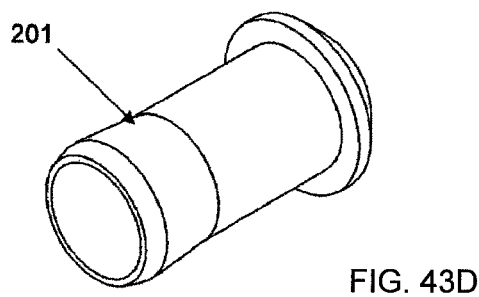

FIG. 41 shows a virtual dovetail assembly where the parts are configured as a cable or electrical connector, so a cable can be soldered, crimped, or otherwise connected within the apertures 181 183. A retained spring (not shown) could be trapped within, at the end of the curved pin end FIG. 42 shows a virtual dovetail assembly where the parts are configured as a hose connector, where the sleeve 192 is expansionary via slot details 194.

FIG. 43 shows an actual dovetail assembly where the parts are configured as a hose connector, where the sleeve is without slots and either is elastic in character, or is rigid and locks via translation movement and a taper engagement. Fluid or gas can pass through the continuous aperture (204), and the locking of the parts, and the sealing against leakage, can be via the gas or liquid pressure in the aperture (204), and/or a retained spring detail (not shown).

FIGS. 44 & 45 show a number of helical hose connectors, HHC with the general form of an outer helical part and a tapered inner part.

a. The A, B and C illustrations of both FIGS. 44 & 45 show the same part in various forms of deformation where A is the un altered "resting-state" part, and B is altered by rotation of the outer spring, (thereby shortening and expanding it), and C is altered by pulling the outer spring back, (thereby shortening and expanding it but more so than in B).

b. The D E and F illustrations of both FIGS. 44 & 45 show HHC forms with respectively flat round and diamond cross section wires.

c. The G configuration of both FIGS. 44 & 45 is a HHC in a unitary form capable of being made with reinforced plastic, perhaps with co moulded sealing and branding details (not shown).

d. The A"-G" illustrations show cross-sectional views of the A-G illustrations of both FIGS. 44 & 45.

FIG. 46 close up sections of FIGS. 44D and 44G here designated 46D and 46G.

46D. Is a single wind of rectangular section wire with an outer area/part 120, and an inner area/part 121, which are both continuous via a spiral of wire 122. There is also a gripping spiral or "grip" 124 which is continuous with the wire of the outer area 120.

46G. is an HHC where the grip and outer part are heavier in section (perhaps plastic with an internal metal spring—not shown), and the outer part is a two-start helix in form. FIG. 44G is shown as a simple connector which may be threadably 128 connected to a tap or other fitting (not shown). Alternative forms would be hose to hose connections. The inner part is illustrated here as solid in form, not helical, and may be made by injection molding, die casting, or any other means.

In use the following sequence may be used:
1. The grip 124 is pulled back and or rotated (thereby increasing its internal bore, and shortening the length 129), and
2. A hose or tube (not shown) may be then inserted in the apertures 123, and
3. When the grip is released it will spring-back and make the outer area grip on the external surface of the hose.

Notes:
d. An advantage of this invention over the prior art is that it is naturally robust in use as if the hose is pulled on the outer area will helically deform and grip even more securely on the hose.)
e. The internal part 121 serves to support the hose as it is compressed by the outer part 120.
f. The aperture represented by the arrows 123 may be in any cross section, prior to hose insertion, but at least part of it will need to be "too small" for the hose. In this way an interference fit may be attained.
g. The inner or outer parts may be solid or helical, and incorporate barbs, threads, or sealing detail/rubber/elastomer.
h. There may be a sealing detail between or adjacent to any parts or helical winds. The parts could therefore be made by co-molding via injection molding technology.
i. A number of parts could form an assembly but a single part is illustrated in 46G to show that the invention could be a single unitary item.
j. When the grip is pulled back there could be a detail that retains it, so that the hose can be inserted and then the grip "released". In this way the HHC is in the nature of a self locking mechanism. The prior art requires a person to define the sealing and locking force. the present invention does that task automatically (and is stronger if the hose is pulled vigorously)
k. A wire form a HHC can have the outer part winding in the same of different directions to the inner part wind. Each has applications:
   A counter wind direction to the inner part, as shown in FIGS. 44a to 44f, will mean that when assembled the hosed cannot be wound out, as the inner and outer parts resist opposite rotations
   However if the winds are the same direction the hose can be helically wound into the aperture, as there would be a direction of hose wind which would reduce the internal part an at the same time increase the outer part.
   Therefore counter wind is more secure but same direction wind is perhaps quicker and more convenient/use-friendly.

Aspects of the present invention have been described by way of example only and it should be appreciated that modifications and additions may be made thereto without departing from the scope thereof as defined in the appended claims.

What I claim is:

1. A releasable connector for holding an elastically deformable tube, the connector comprising:
   a connection head and an elastically deformable tube;
   an inner portion extending from the connection head;
   an outer portion integrally formed with and extending from the connection head and at least partially surrounding the inner portion to define an entry passage receiving the elastically deformable tube, the inner portion having a length extending from the connection head to a distal end which is greater than a length of the outer portion extending form the connection head to a distal end;
   wherein at least one segment in the inner portion or outer portion is helical and is configured to form at least one constricting area in the entry passage of lesser width than the width of a wall of the deformable tube, and
   is further configured so that movement of the helical portion by at least one of a translational and a rotation force, or a combination of both, expands the width of the entry passage allowing movement of the tube past the constricting area,
   wherein after insertion of the tube past the constricting area, and
   on application of a translational force to the tube in a direction away from the connection head,
   the outer portion and inner portion are between them configured to transfer said translational force to the helical portion, such that the width of the constricting area is reduced and the inner portion and the outer portion caused to bear further against the elastically deformable tube, while the helical portion retains a configuration whereby at least one of a translational and rotational force, or a combination thereof, expands the width of the passage allowing the tube to exit; and
   wherein said releasable connector is a single monolithic piece.

2. A connector as claimed in claim 1 wherein the inner portion is substantially rigid.

3. A connector as claimed in claim 1 wherein the outer portion is substantially rigid.

4. A connector as claimed in claim 1 wherein the movement of the inner and outer portions relative to each other is as a consequence of translation of at least one of the portions in the direction of the longitudinal access of the tube.

5. A connector as claimed in claim 1 wherein all of the components and connector are integrally formed with each other.

6. A connector as claimed in any one of claim 1 wherein the connection head and inner portion have a bore aligned with the inner bore of the deformable tube.

7. A connector as claimed in claim 1 wherein the connection head is threaded.

8. A connector as claimed in claim 1 wherein, after the hose is inserted past the constricting area, there is a bias for at least one of the portions to return towards its original position.

9. A connector as claimed in claim 1 wherein, after the hose is inserted past the constricting area, there is a bias for at least one of the portions to return towards its original shape.

10. A kit set including a connector as claimed in claim 1 and an elastically deformable tube dimensioned to fit within the entry passage of the connector.

11. The connector as claimed in claim 1 wherein said outer portion adjacent the entry passage includes a chamfered internal edge.

12. The connector of claim 1 wherein said constricting area comprises a bulge portion on an exterior surface of the inner portion.

13. The connector of claim 12 wherein said bulge is disposed inwardly from the entry passage such that said inner portion comprises a deformable tube receiving end having a diameter narrower than said bulge portion.

14. The connector of claim 12 wherein said helical slot includes an elastomeric insert.

15. The connector of claim 12 wherein said bulge portion forms a reverse taper lock area in conjunction with said outer portion.

16. The connector of claim 1 wherein said outer portion comprises a tube form including a helical slot.

17. The connector of claim 1 wherein said inner portion includes a tapered exterior surface.

18. A releasable connector for holding an elastically deformable tube, the connector comprising:
   a connection head and an elastically deformable tube;
   an inner portion extending from the connection head;
   an outer portion integrally formed with and extending from the connection head and at least partially surrounding the inner portion to define an entry passage receiving the elastically deformable tube;
   wherein at least one segment in the inner portion or outer portion is helical and is configured to form at least one constricting area in the entry passage of lesser width than the width of a wall of the deformable tube, and
   is further configured so that movement of the helical portion by at least one of a translational and a rotation force, or a combination of both, expands the width of the entry passage allowing movement of the tube past the constricting area,
   wherein after insertion of the tube past the constricting area, and
   on application of a translational force to the tube in a direction away from the connection head,
   the outer portion and inner portion are between them configured to transfer said translational force to the helical portion, such that the width of the constricting area is reduced and the inner portion and the outer portion caused to bear further against the elastically deformable tube, while the helical portion retains a configuration whereby at least one of a translational and rotational force, or a combination thereof, expands the width of the passage allowing the tube to exit;
   wherein the outer portion is helical and an end of the helical outer portion remote from the connection head comprises a continuous ring of material extending circumferentially around the tube in a coupled condition; and
   wherein said releasable connector is a single monolithic piece.

19. A releasable connector for holding an elastically deformable tube, the connector comprising:
   a connection head and an elastically deformable tube;
   an inner portion extending from the connection head;
   an outer portion integrally formed with and extending from the connection head and at least partially surrounding the inner portion to define an entry passage receiving the elastically deformable tube;
   wherein the inner portion is elongated to a degree greater than the outer portion and includes a bulge portion or an exterior surface configured to form at least one constricting area in the entry passage of lesser width than the width of a wall of the deformable tube, and
   is further configured so that movement by at least one of a translational and a rotation force, or a combination of both, expands the width of the entry passage allowing movement of the tube past the constricting area,
   wherein after insertion of the tube past the constricting area, and on application of a translational force to the tube in a direction away from the connection head, the width of the constricting area is reduced and the inner portion and the outer portion caused to bear further against the elastically deformable tube, and whereby at least one of a translational and rotational force, or a combination thereof, expands the width of the passage allowing the tube to exit; and
   wherein said releasable connector is a single monolithic piece.

* * * * *